(12) United States Patent
Luke et al.

(10) Patent No.: US 7,203,854 B2
(45) Date of Patent: Apr. 10, 2007

(54) SYSTEM FOR RECONFIGURING A COMPUTER BETWEEN A HIGH POWER AND HIGH FUNCTIONALITY CONFIGURATION AND A LOW POWER AND LOW FUNCTIONALITY CONFIGURATION

(75) Inventors: Hok-Sum Horace Luke, Mercer Island, WA (US); Otto G. Berkes, Seattle, WA (US); David W. Williams, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 428 days.

(21) Appl. No.: 10/777,410

(22) Filed: Feb. 12, 2004

(65) Prior Publication Data

US 2005/0182976 A1    Aug. 18, 2005

(51) Int. Cl.
*G06F 1/26* (2006.01)
(52) U.S. Cl. .................................... 713/320; 713/324
(58) Field of Classification Search ................. 713/300, 713/320–324
See application file for complete search history.

(56) References Cited

U.S. PATENT DOCUMENTS

| | | | |
|---|---|---|---|
| 5,423,045 A | 6/1995 | Kannan et al. | |
| 5,511,205 A | 4/1996 | Kannan et al. | |
| 5,548,763 A | 8/1996 | Combs et al. | |
| 5,689,715 A | 11/1997 | Crump et al. | |
| 5,920,727 A * | 7/1999 | Kikinis et al. | 713/323 |
| 5,958,058 A * | 9/1999 | Barrus | 713/320 |
| 6,065,123 A * | 5/2000 | Chou et al. | 713/322 |
| 6,167,524 A | 12/2000 | Goodnow et al. | |
| 6,457,132 B1 * | 9/2002 | Borgendale et al. | 713/320 |
| 2002/0174371 A1 | 11/2002 | Padawer et al. | |
| 2004/0068627 A1 | 4/2004 | Sechrest et al. | |

OTHER PUBLICATIONS

White Ron, How Computers Work, 2002, Que, 6th ed. pp. 190-193.*
Agrawal, Prathima, "Energy Efficient Protocols for Wireless Systems", *Proceedings of the 1998 9th IEEE International Symposium on Personal indoor and Mobile Radio Communications, PIMRC*, vol. 2, pp. 564-569 (1998).
Compaq Computer Corporation et al., "Advanced Configuration and Power Interface Specification", Revision 2.0 (Jul. 2000), printed on Nov. 21, 2003 from www.acpi.info/DOWNLOADS/ACPIspec20.pdf.

(Continued)

*Primary Examiner*—Chun Cao
*Assistant Examiner*—Mark Connolly
(74) *Attorney, Agent, or Firm*—Woodcock Washburn LLP

(57) ABSTRACT

An intermittent computing system state and intermittent computing module is described for a power-constrained personal computer. In the intermittent computing system state, the power-constrained personal computer may transition between sub-states of the intermittent computing system state according to an intermittent computing schedule. Each intermittent computing sub-state may be associated with hardware power sets and software power sets. Altering power supply to hardware components referenced by hardware power sets may alter power consumed in associated intermittent computing sub-states. A caching mechanism may be configured to make it likely that software components referenced by software power sets are loaded into powered storage types during associated intermittent computing sub-states. In the intermittent computing system state, periods of high functionality may be available over extended periods without the high power consumption associated with a continuous working system state. Average power consumption may be adjusted by varying the intermittent computing schedule.

27 Claims, 14 Drawing Sheets

OTHER PUBLICATIONS

Jones et al., "A Survey of Energy Efficient Network Protocols for Wireless Networks", *Wireless Networks*, vol. 7, No. 4, pp. 343-358 (Jul. 2001).

Berg et al., "System Power Management for PC Cards," *IC Card Systems and Design*, vol. 4, No. 4, pp. 31-33 (May-Jun. 1994).

\* cited by examiner

SYSTEM FOR RECONFIGURING A COMPUTER BETWEEN A HIGH POWER AND HIGH FUNCTIONALITY CONFIGURATION AND A LOW POWER AND LOW FUNCTIONALITY CONFIGURATION

FIELD OF THE INVENTION

This invention pertains generally to computing devices and, more particularly, to power-constrained computing devices.

BACKGROUND OF THE INVENTION

The personal computer (PC) has become a common feature of everyday business and domestic life. From document creation and sharing to scheduling and messaging; personal computers have become part of the way people communicate and interact. As personal computers have become more useful, personal computer users have come to demand that their computers be available whenever and wherever they are.

Mobile personal computers have the potential to make personal computing more available than ever before but typically, the availability of a mobile personal computer is constrained by its limited mobile power supply. If the power supply runs out, the computer becomes unavailable. As a result, a mobile personal computer user seeking to maximize availability may need to monitor and conserve the mobile power supply. At times, for example, when power consumption associated with a task is high, maintaining even modest availability may require significant effort.

Power conservation schemes for conventional mobile personal computers typically involve the computer user manually switching the computer to a working state with relatively high power consumption when attentively working with the computer and then switching the computer to a sleeping or off state with relatively low power consumption otherwise. There are variations on this theme, for example, the computer may determine (at times mistakenly) that the computer user is not attentive enough to justify the high power consumption of the working state and then automatically switch to the sleeping or off state. A problem with such schemes is that they leave the computer effectively unavailable whenever the computer user is not attentively working with the computer. For example, events and alerts that occur during this period of unavailability may not be brought timely to the attention of the computer user and useful background work may be delayed thus lowering efficiency.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment of the invention, a timer is configured to generate an up alarm signal. A power-constrained personal computer may be reconfigured from a first configuration to a second configuration. The first configuration being one of a set of relatively high functionality and consuming relatively high amounts of power. The second configuration being one of a set of relatively low functionality and consuming relatively low amounts of power. In response to the up alarm signal, the power-constrained personal computer may be reconfigured from the second configuration to a third configuration. The third configuration being from the same set of configurations as the first configuration and possibly the same as the first configuration.

In an embodiment of the invention, the power-constrained personal computer is transitioned into an intermittent computing system state. In the intermittent computing system state, the power-constrained personal computer is transitioned between sub-states of the intermittent computing system state. In each sub-state of the intermittent computing system state, the power-constrained personal computer is configured such that the amount of power it consumes is altered. In an embodiment of the invention, these steps are performed by a power cycle engine of an intermittent computing module.

In an embodiment of the invention, software components interact with one or more elements of an application programming interface (API) of the intermittent computing module. The elements of the application programming interface may include an Enter Intermittent Computing State element and a Get/Set Intermittent Computing Schedule element. Interacting with the Enter Intermittent Computing State element may cause the power-constrained personal computer to transition to the intermittent computing system state. Interacting with the Get/Set Intermittent Computing Schedule element may configure the intermittent computing schedule.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Prior to proceeding with a description of the various embodiments of the invention, a description of an example computing system environment and computer in which the various embodiments of the invention may be practiced is provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein may include any device that electronically executes one or more programs, such as personal computers (PCs), multi-processor systems, network PCs, minicomputers, tablet PCs, laptop computers and the like. The invention may also be employed in distributed computing environments, where tasks are performed by remote processing devices that are linked through a communications network. In a distributed computing environment, programs may be located in both local and remote memory storage devices.

Figure 1:
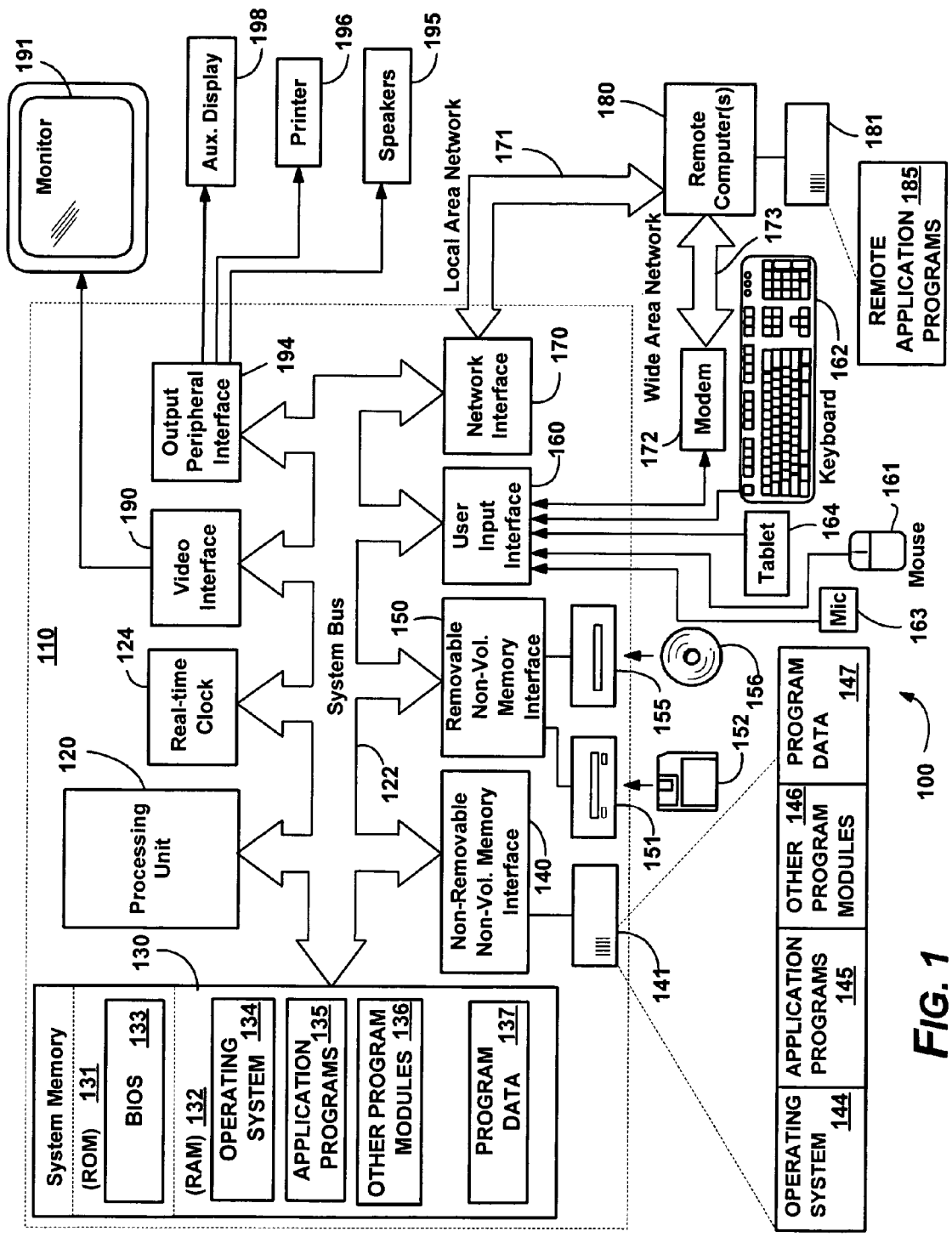
FIG. 1 is a schematic diagram generally illustrating an exemplary computer system usable to implement an embodiment of the invention.

FIG. 1 illustrates an example of a suitable computing system environment 100 in which the invention may be incorporated. The computing system environment 100 is only one example of a suitable computing environment and is not intended to suggest any limitation as to the scope of use or functionality of the invention. Embodiments of the invention may be incorporated into computing system environments with greater or fewer components than is illustrated in the example computing system environment 100.

With reference to FIG. 1, a system incorporating an embodiment of the invention may include a computer 110. Components of the computer 110 may include, but are not limited to, a processing unit 120, a system memory 130, and a system bus 122 that couples various system components including the system memory to the processing unit 120. The system bus 122 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 may include a real-time clock (RTC) 124. The real-time clock 124 may maintain a representation of the calendar date and time of day, ideally, although not necessarily, in synchronization with a national or international standard. The real-time clock 124 may be powered by an independent power supply, i.e., a power supply independent of one or more power supplies that provide power to other components of the computer 110 and/or the computing system environment 100. For example, the independent power supply of the real-time clock 124 may be designed to last for years between recharging or replacement. The real-time clock 124 may be further capable of maintaining one or more alarm settings and/or count-down timers and, for example, issuing an alarm signal when the clock time reaches one of the alarm settings or when one of the count-down timers reaches zero.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random-access memory (RAM), read-only memory (ROM), electrically erasable programmable read-only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection., and wireless media such as acoustic, radio frequency (RF), infrared and other wireless media. Combinations of the any of the above may also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 122 through a non-removable memory interface such as interface 140, and magnetic disk drive 151 and optical disk drive 155 are typically connected to the system bus 122 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a tablet 164, a microphone 163, a keyboard 162 and pointing device 161, commonly referred to as a mouse, trackball or touch pad. The tablet 164 may include one or more touch screens and/or electronic digitizers (not shown in FIG. 1). Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device may also connected to the system bus 122 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. The computer 110 may also include peripheral output devices such as speakers 195, printer 196 and auxiliary display 198, which may be connected through an output peripheral interface 194 or the like. The auxiliary display 198 may include one or more liquid crystal displays (LCD) and/or one or more light emitting diodes (LED) or the like. For example, the auxiliary display 198 may have limited display capabilities relative to the monitor 191 but consume less power.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 122 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Each hardware component in the computing system environment 100 may require power to function. For example, the processing unit 120, the system memory 130 and the system bus 122 may each require power to function. Each hardware component in the computing system environment 100 may be capable of being partially powered. Partially powered hardware components may have reduced or limited functionality and/or performance. For example, when partially powered, the system bus 122 may enable communications between the processing unit 120 and the system memory 130 but not between the processing unit 120 and the video interface 190.

The power to the hardware components of the computing system environment 100 may be supplied from one or more power supplies. For example, components of the computing system environment 100 may be part of a mobile personal computer powered from one or more limited mobile power supplies such as batteries or fuel cells. The supply of power to each of the hardware components of the computing system environment 100 may be controllable from hardware, firmware and/or from software. Such control may be coarse or fine grained. For example, the operating system 134 may be able to cause the computer 110 as a whole to transition from a fully powered state to a "soft off" or minimally powered state. In addition the operating system 134 may be able to control power supply to individual hardware components, for example, the operating system 134 may be able to cause the hard disk drive 141 to transition between fully powered and minimally powered states. Additional context and details relevant to the invention may be found in the *Advanced Configuration and Power Interface Specification, Revision* 2.0 dated Jul. 27, 2000 published by the advanced configuration and power interface special interest group (ACPI SIG).

For clarity, embodiments of the invention are described with reference to mobile personal computers, however aspects of the invention may be advantageously incorporated into any power-constrained computing device.

A mobile personal computer (e.g., the computer 110 of FIG. 1) may have one or more system power configurations that provide relatively high levels of functionality and consume relatively high levels of power (e.g., the working system state S0) and one or more system power configurations that provide relatively low levels of functionality and consume lower levels of power (e.g., the sleeping system state S3). In an embodiment of the invention, the mobile personal computer may include an intermittent computing system state. In the intermittent computing system state, the mobile personal computer may cycle between system power configurations that provide higher and lower levels of functionality and that consume higher and lower levels of power. In the intermittent computing system state, the mobile personal computer may maintain a relatively high level of functionality availability over a period (e.g., 24 hours) with a relatively low average consumption of power for the period.

Figure 2:
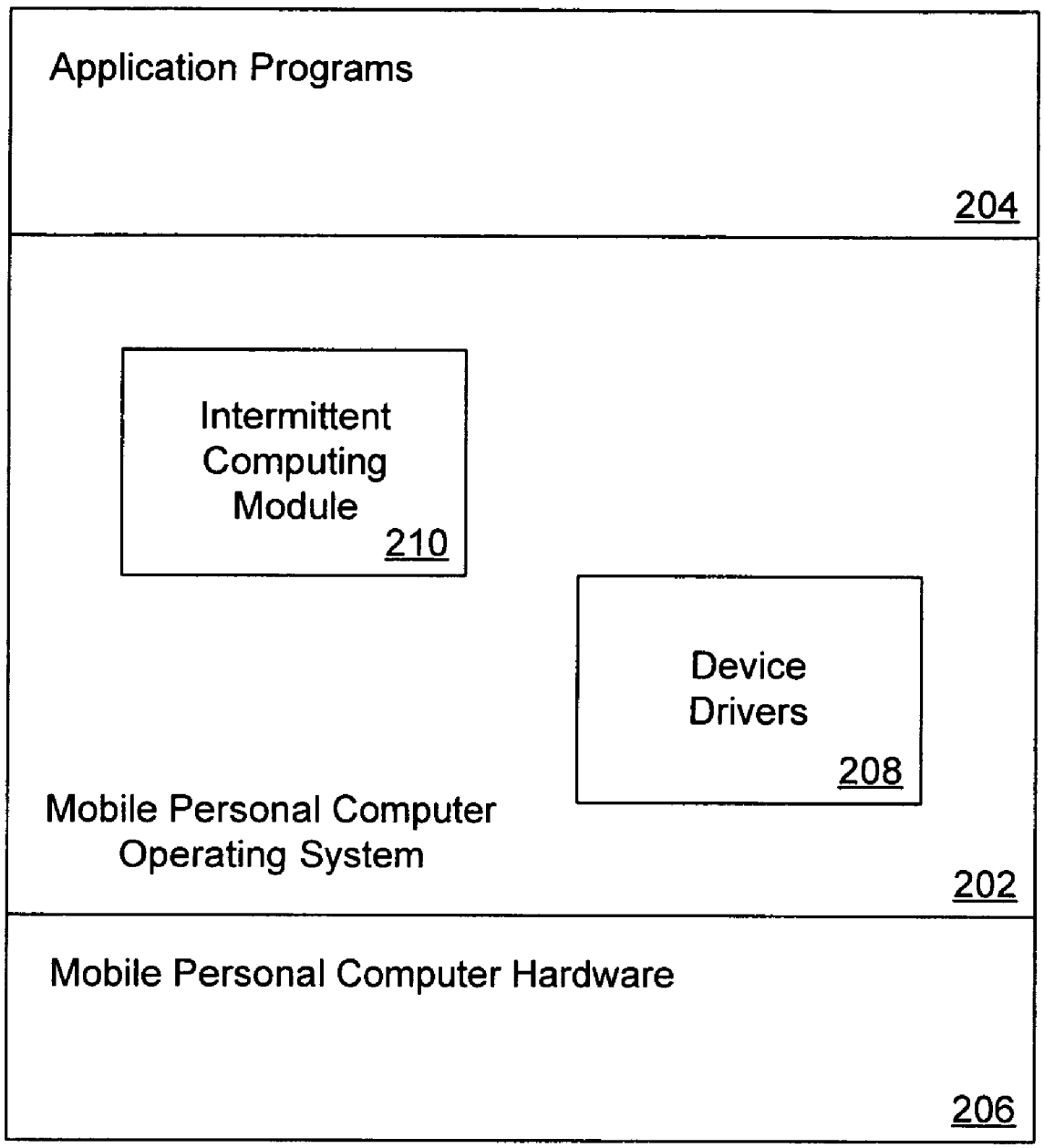
FIG. 2 is a schematic diagram illustrating an example high level systems architecture in accordance with an embodiment of the invention.

FIG. 2 depicts an example high level systems architecture in accordance with an embodiment of the invention. A mobile personal computer operating system 202 (e.g., the operating system 134 of FIG. 1) provides services to application programs 204 and interacts with mobile personal computer hardware 206. For example, the mobile personal computer hardware 206 may include suitable components of the computing system environment 100 (FIG. 1).

Device drivers 208 may enable the mobile personal computer operating system 202 to interact with the mobile personal computer hardware 206. The device drivers 208 may include one or more device drivers for each hardware component of the mobile personal computer hardware 206. For example, each of the non-removable non-volatile memory interface 140, the network interface 170 and the video interface 190 may have a corresponding device driver. One of the device drivers 208 may enable the mobile personal computer operating system 202 to interact with multiple hardware components of the mobile personal computer hardware 206.

The mobile personal computer operating system 202 may include an intermittent computing module 210. The intermittent computing module 210 may enable the mobile personal computer to operate in the intermittent computing system state. For example, the intermittent computing module 210 may schedule and execute periodic transitions between different system power configurations.

Figure 3:
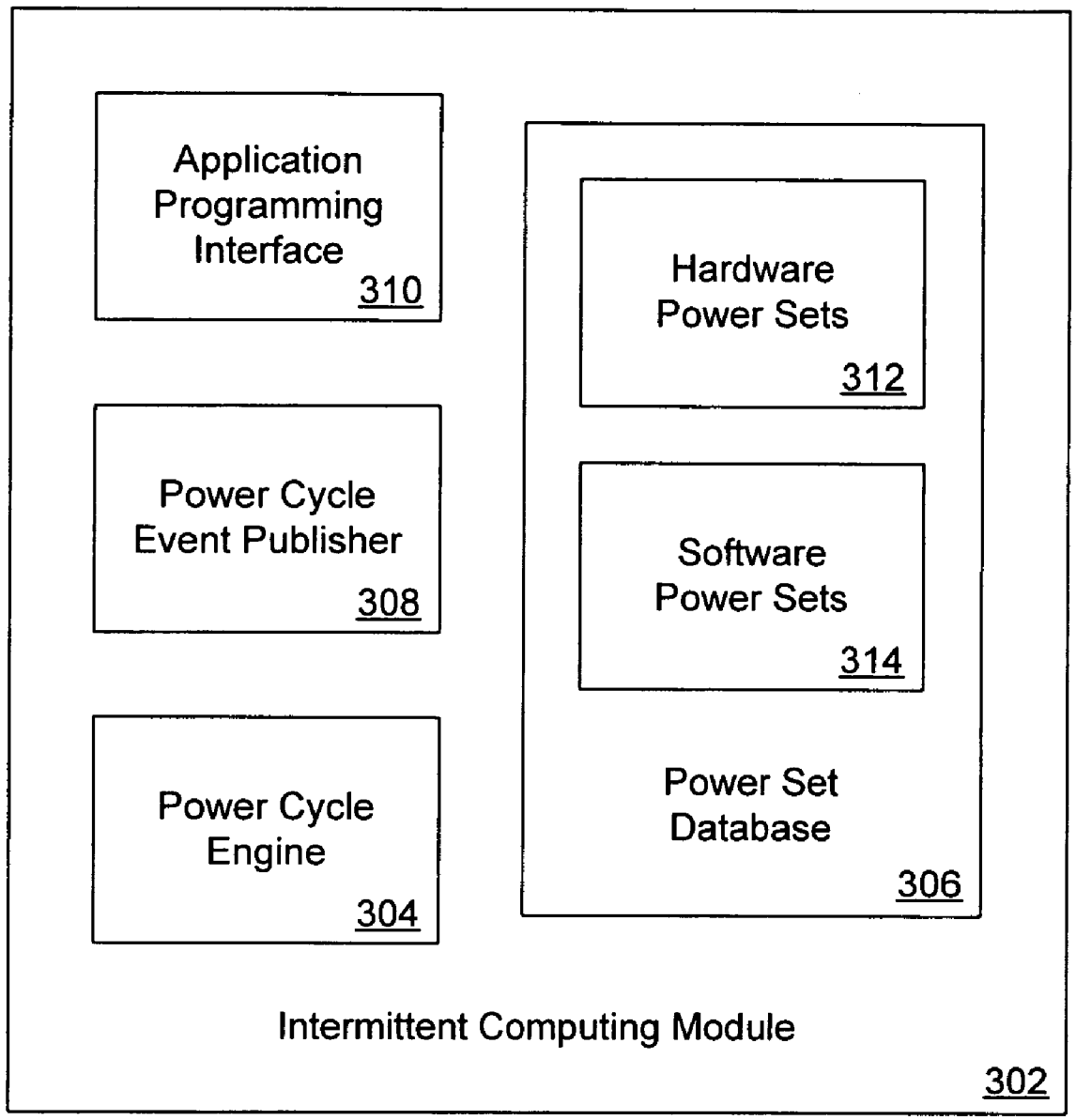
FIG. 3 is a schematic diagram illustrating an example intermittent computing module in accordance with an embodiment of the invention.

FIG. 3 depicts an example intermittent computing module 210 (FIG. 2) in accordance with an embodiment of the invention. The example intermittent computing module 302 includes a power cycle engine 304, a power set database 306, a power cycle event publisher 308 and an application programming interface (API) 310. The power set database 306 may contain hardware power sets 312 and software power sets 314.

Each hardware power set in the hardware power sets 312 may reference a set of computer hardware components associated with a particular level of functionality. For example, one of the hardware power sets may reference the minimum set of mobile personal computer hardware 206 (FIG. 2) components required for network communications. Similarly, each software power set in the software power sets 314 may reference a set of computer software components associated with a particular level of functionality. For example, one of the software power sets may reference the minimum set of mobile personal computer software components required to check for the presence of a wireless network. Software power sets 314 may reference any suitable computer software components, for example, mobile personal computer operating system 202 components including device drivers 208, application programs 204 and application program components.

The power cycle engine 304 may trigger periodic transitions between low or minimal consumption system power configurations (e.g., sleeping system states) and higher consumption system power configurations, for example, as defined by hardware power sets 312. The power cycle engine 304 may supply power to, partially power or remove power from computer hardware components. The power cycle engine 304 may arrange for computer software components referenced by software power sets 314 to reside in preferred storage types, for example, storage types that result in lower power consumption over one or more power cycles. The power cycle engine 304 may trigger system power configuration transitions according to an intermittent computing schedule.

The mobile personal computer operating system 202 (FIG. 2) and the application programs 204 may interact with the intermittent computing module 302 through the application programming interface 310. The application programming interface 310 may provide the ability to create, read, update and delete hardware power sets 312 and software power sets 314 in the power set database 306. The application programming interface 310 may provide the ability to configure the intermittent computing schedule. The application programming interface 310 may provide the ability for computer software components to subscribe to power cycle events (e.g., system power configuration transitions) published by the power cycle event publisher 308. Further details of intermittent computing module application programming interfaces in accordance with an embodiment of the invention are described below with reference to FIG. 12.

Conventional personal computers have typically defined a working system state (e.g., system state S0) and one or more sleeping system states (e.g., system states S1–S5). Such system states are known in the art so only some of their details are described here. User mode computer software components (e.g., the application programs 135 of FIG. 1) may be executed (i.e., by the processing unit 120) when the personal computer is in the working system state. When the personal computer in one of the sleeping system states, the execution of computer software components may be restricted to system mode (e.g., kernel mode) computer software components, such as operating system 134 software components, or execution may be halted. Halting execution of computer software components may enable a transition of the processing unit 120 to a low power consumption configuration.

Figure 4:
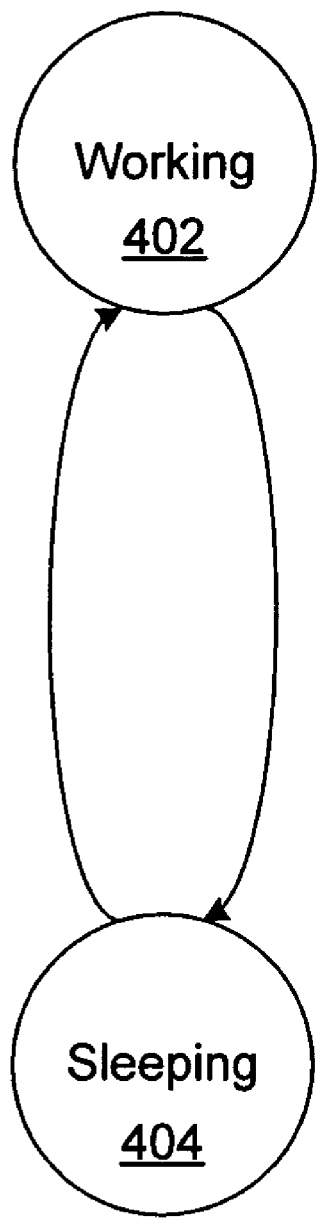
FIG. 4 is a state diagram depicting example system states in a conventional personal computer.

FIG. 4 depicts example system states in a conventional personal computer. The depicted system states include a working system state 402 and a sleeping system state 404. The sleeping system state 404 may be any of the sleeping system states defined for the conventional personal computer. Conventional sleeping system states may be distinguished by power consumption level and by the amount of time required for the conventional personal computer to transition from the sleeping system state to the working system state 402. Typically, sleeping system states with lower power consumption give up more working system state context and thus may require additional context initialization to transition to the working system state 402. For example, system memory 130 (FIG. 1) may remain powered during sleeping system state S3 thus preserving some operating system 134 context, but transitioning to the working system state 402 from sleeping system state S4 may require hardware and software re-initialization and transitioning to the working system state 402 from sleeping system state S5 ("soft off," a minimal power consumption system state) may require a full operating system 134 initialization ("reboot" or restart).

The transition from the sleeping system state 404 to the working system state 402 is typically manually initiated by the personal computer user, for example, by pressing a key on the keyboard 162 (FIG. 1). The transition from the working system state 402 to the sleeping system state 404 may be manually initiated by the personal computer user, for example, by explicitly requesting the operating system 134 to do so, or by pressing a dedicated button labeled "sleep" or "off." The operating system 134 may initiate the transition from the working system state 402 to the sleeping system state 404 without user intervention, for example, if the operating system 134 determines that the computer has not received user input for some period of time. Some conventional personal computers have the ability to transition from the sleeping system state 404 to the working system state 402 without direct user intervention, for example, the transition may be initiated by an alarm signal sent by the real-time clock 124 to the processing unit 120.

Figure 5:
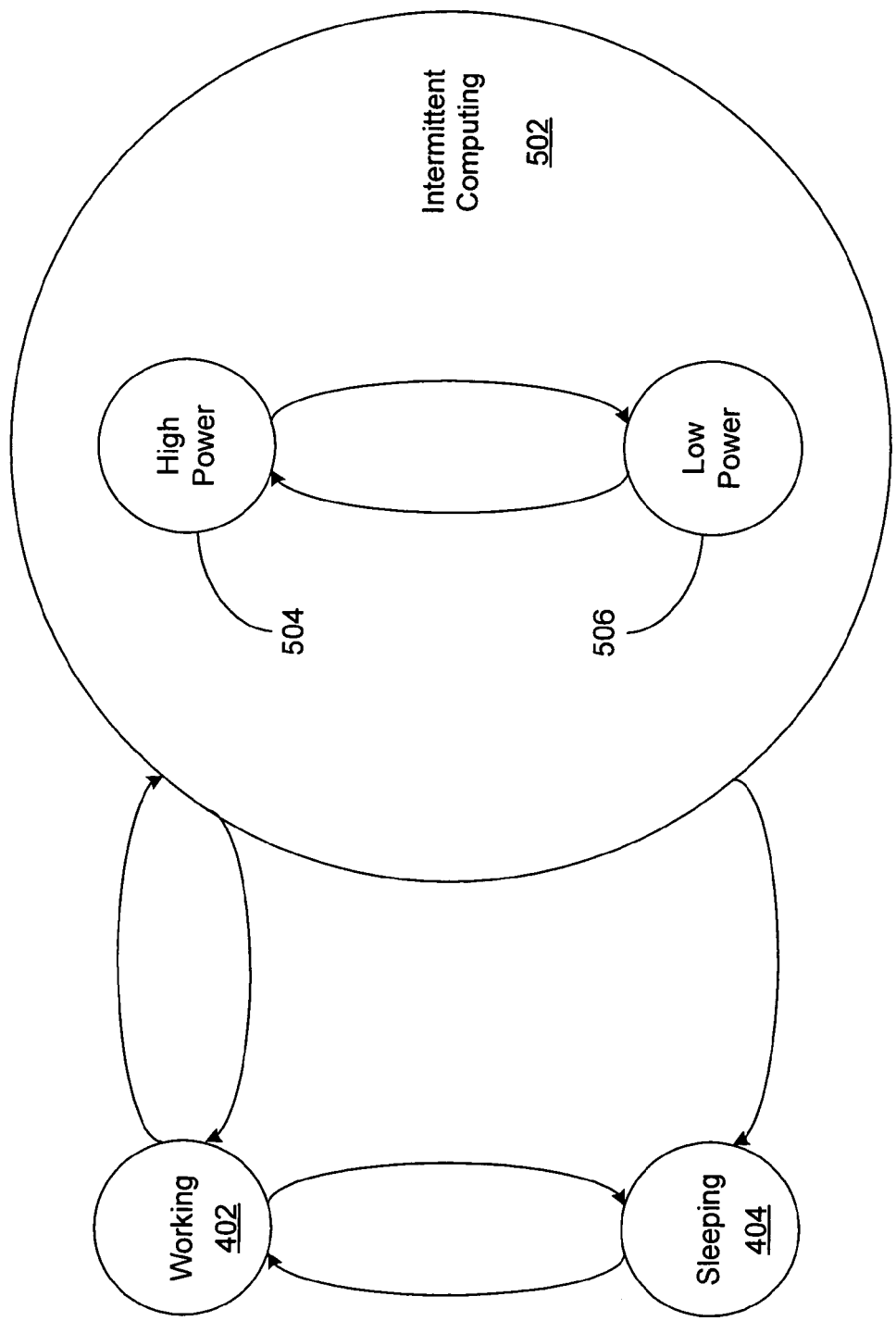
FIG. 5 is a state diagram depicting example system states in accordance with an embodiment of the invention including a bi-level intermittent computing system state.

In an embodiment of the invention, the mobile personal computer may have an intermittent computing system state. FIG. 5 depicts example system states in accordance with an embodiment of the invention. In addition to the working system state 402 and the sleeping system state 404 described above with reference to FIG. 4, FIG. 5 shows an intermittent computing system state 502. The intermittent computing system state 502 may include sub-states. In this example, the intermittent computing system state 502 includes a high power system sub-state 504 and a low power system sub-state 506.

In the low power system sub-state 506, the mobile personal computer may consume less power from its limited supply than when it is in the high power system sub-state 504. However, the high power system sub-state 504 may enable mobile personal computer functionality (including performance levels) not available in the low power system sub-state 506. The power consumption and the functionality available in the high power system sub-state 504 and the low power system sub-state 506 may be determined by associated hardware power sets 312 (FIG. 3) and/or software power sets 314. The high power system sub-state 504 may also be one of the working system states, e.g., system state S0. The low power system sub-state 506 may also be one of the sleeping system states, e.g., system state S3.

In the intermittent computing system state 502, the mobile personal computer may automatically (e.g., without direct user intervention) cycle between the high power system sub-state 504 and the low power system sub-state 506. For example, the periodic sub-state transitions may be triggered by the power cycle engine 304 (FIG. 3) according to the intermittent computing schedule.

The mobile personal computer operating system 202 (FIG. 2) may be configured to trigger the transition from the working system state 402 to the intermittent computing system state 502. For example, the mobile personal computer operating system 202 may be configured to trigger the transition from the working system state 402 to the intermittent computing system state 502 instead of to the sleeping system state 404. The relatively high level of functionality of the high power system sub-state 504 may be periodically available in the intermittent computing system state 502 whereas it may not be available in the sleeping system state 404. Nevertheless, the intermittent computing schedule may be such that the power consumed in the intermittent computing system state 502 may be less, on average, than the power consumed in the working system state 402.

The mobile personal computer may transition from the intermittent computing system state 502 to the working system state 402. For example, the working system state 402 may be more suitable than the intermittent computing system state 502 when the mobile personal computer user is attentively working with the mobile personal computer. The mobile personal computer may transition from the intermittent computing system state 502 to the sleeping system state 404. For example, while the intermittent computing system state 502 may consume less power, on average, than the working system state 402, the intermittent computing system state 502 may still consume more power than the sleeping system state 404. If the mobile personal computer is very low on power, the sleeping system state 404 may be more suitable than the intermittent computing system state 502.

Figure 6:
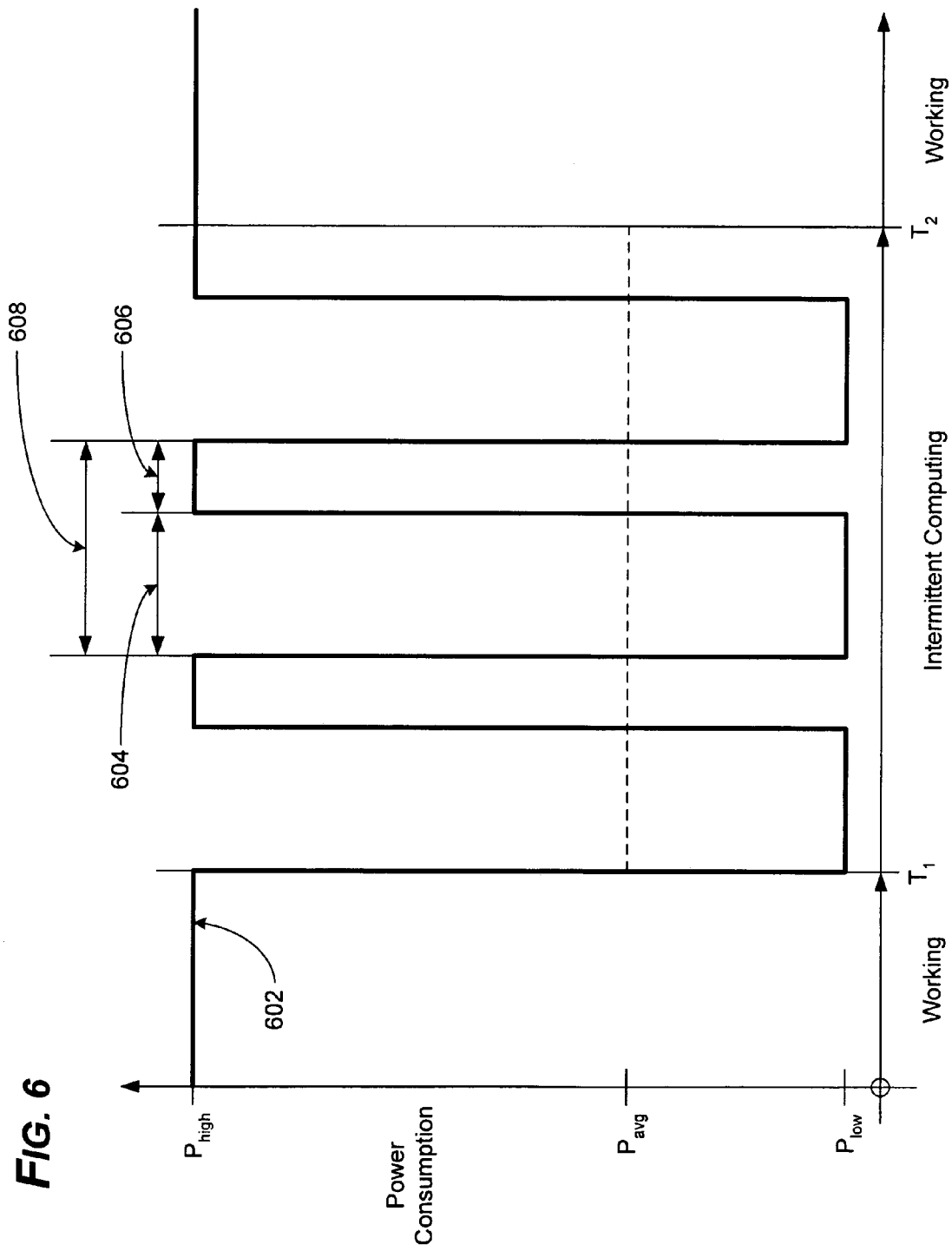
FIG. 6 is an example of a relatively simple power cycle graph in accordance with an embodiment of the invention.

FIG. 6 shows an example power cycle graph in accordance with an embodiment of the invention. The example power cycle graph 602 shows the level of power consumption of the mobile personal computer changing as the mobile personal computer changes system states. The mobile personal computer begins in the working system state 402 (FIG. 5), then transitions to the intermittent computing system state 502 at time $T_1$. At time $T_2$, the mobile personal computer transitions from the intermittent computing system state 502 back to the working system state 402.

When the mobile personal computer is in the working system state 402 (FIG. 5), its power consumption is at a high level $P_{high}$. When the mobile personal computer is in the intermittent computing system state 502, its power consumption cycles between a low level $P_{low}$ and the high level $P_{high}$ according to a relatively simple intermittent computing schedule. In this example, the high level $P_{high}$ of power consumption in the intermittent computing system state 502 is the same as the level of power consumption in the working system state 402, but this is not necessarily the case.

In this example, each power cycle within the intermittent computing system state 502 (FIG. 5) is the same. The mobile personal computer remains in the low power system sub-state 506 for a sleep time ($T_{sleep}$) 604 and then transitions to the high power system sub-state 504 for a wake time ($T_{wake}$) 606. The power cycle time ($T_{cycle}$) 608 is the sum of the sleep time 604 and the wake time 606. The power cycle rate is the inverse of the power cycle time 608. The average power $P_{avg}$ consumed during the intermittent computing system state 502 may be calculated using standard techniques, e.g.:

$$P_{avg} = \frac{P_{low}T_{sleep} + P_{high}T_{wake}}{T_{cycle}}$$

The average power $P_{avg}$ consumed while in the intermittent computing system state 502 (FIG. 5) may be varied between, for example, the high level $P_{high}$ and the low level $P_{low}$ by adjusting the intermittent computing schedule. In the case of the relatively simple intermittent computing schedule example depicted in FIG. 6, the intermittent computing schedule may be characterized with two parameters, for example, the sleep time 604 and the wake time 606, or the wake time 606 and the power cycle rate.

An example of functionality that may be available in the high power system sub-state 504 (FIG. 5) that may not be available in the low power system sub-state 506 is the ability for the mobile personal computer to communicate with remote computers 180 (FIG. 1) over a wireless network. In addition to sufficient power supply, the availability of such functionality may depend upon other factors that change over time, for example, the availability of suitable wireless network service. In an embodiment of the invention, the intermittent computing schedule is adjusted in response to such factors. For example, the power cycle rate may be reduced when suitable wireless network service is not available thus reducing average power $P_{avg}$ consumption during the period that the high level $P_{high}$ of power consumption would not result in a higher level of functionality.

Figure 7:
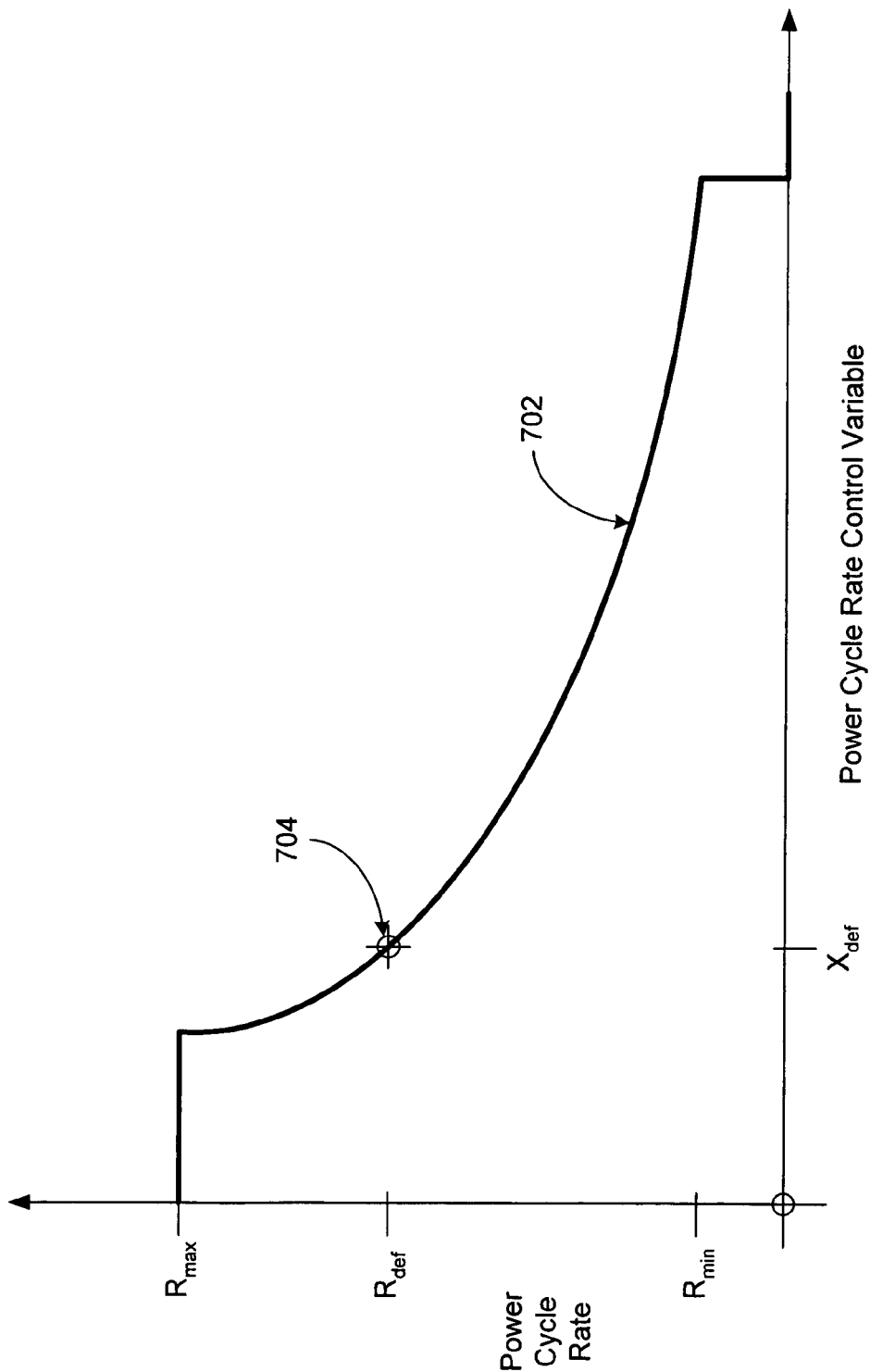
FIG. 7 is an example power cycle rate curve in accordance with an embodiment of the invention.

In an embodiment of the invention, the mobile personal computer, e.g., the intermittent computing module 210 (FIG. 2) of the mobile personal computer, may be configured with a power cycle rate curve that defines how the intermittent computing schedule should be adjusted in response to a power cycle rate control variable. FIG. 7 illustrates an example power cycle rate curve 702 in accordance with an embodiment of the invention. The power cycle rate curve 702 defines how the power cycle rate of the intermittent computing schedule changes in response to the power cycle rate control variable. Examples of suitable power cycle rate control variables include: the amount of time since a particular network was available, or the number of consecutive network presence tests with a false result, other network-specific variables such as nominal or available bandwidth, latency, cost and security level, proportion of power supply consumed, and weighted combinations thereof.

In this example, the power cycle rate of the intermittent computing schedule begins at a default value $R_{def}$ (e.g., 1 cycle every 5 minutes) corresponding to a starting point 704 on the power cycle rate curve 702 and to a default power cycle rate control variable value $X_{def}$. If the power cycle rate control variable value decreases, the power cycle rate increases to a maximum value $R_{max}$ (e.g., 1 cycle every 2 minutes). If the power cycle rate control variable value increases, the power cycle rate decreases to a minimum value $R_{min}$ (e.g., 1 cycle every 60 minutes). If the power cycle rate control variable value increases further, the power cycle rate may temporarily drop to zero until the control variable value decreases again. The default power cycle rate $R_{def}$ may be the maximum power cycle rate $R_{max}$. There may not be a pre-determined default starting point 704, for example, the starting value of the power cycle rate may be determined by the value of the control variable when the mobile personal computer enters the intermittent computing system state 502 (FIG. 5).

Intermittent computing schedules and resultant power cycle graphs may be more complex than the intermittent computing schedule and power cycle graph illustrated in FIG. 6. In particular, the intermittent computing system state 502 (FIG. 5) may have additional system sub-states and thus the power cycle graph may transition to additional levels of power consumption, i.e., levels of power consumption other than the high level $P_{high}$ and the low level $P_{low}$ shown in FIG. 6. Each additional system sub-state may be associated with one or more hardware power sets 312 (FIG. 3) and/or one or more software power sets 314 of the intermittent computing module 302. Hardware power sets 312 and software power sets 314 may be nested i.e., reference other power sets, and at least partially ordered, e.g., in terms of functionality enabled by the power set and/or power consumed by the power set.

Figure 8:
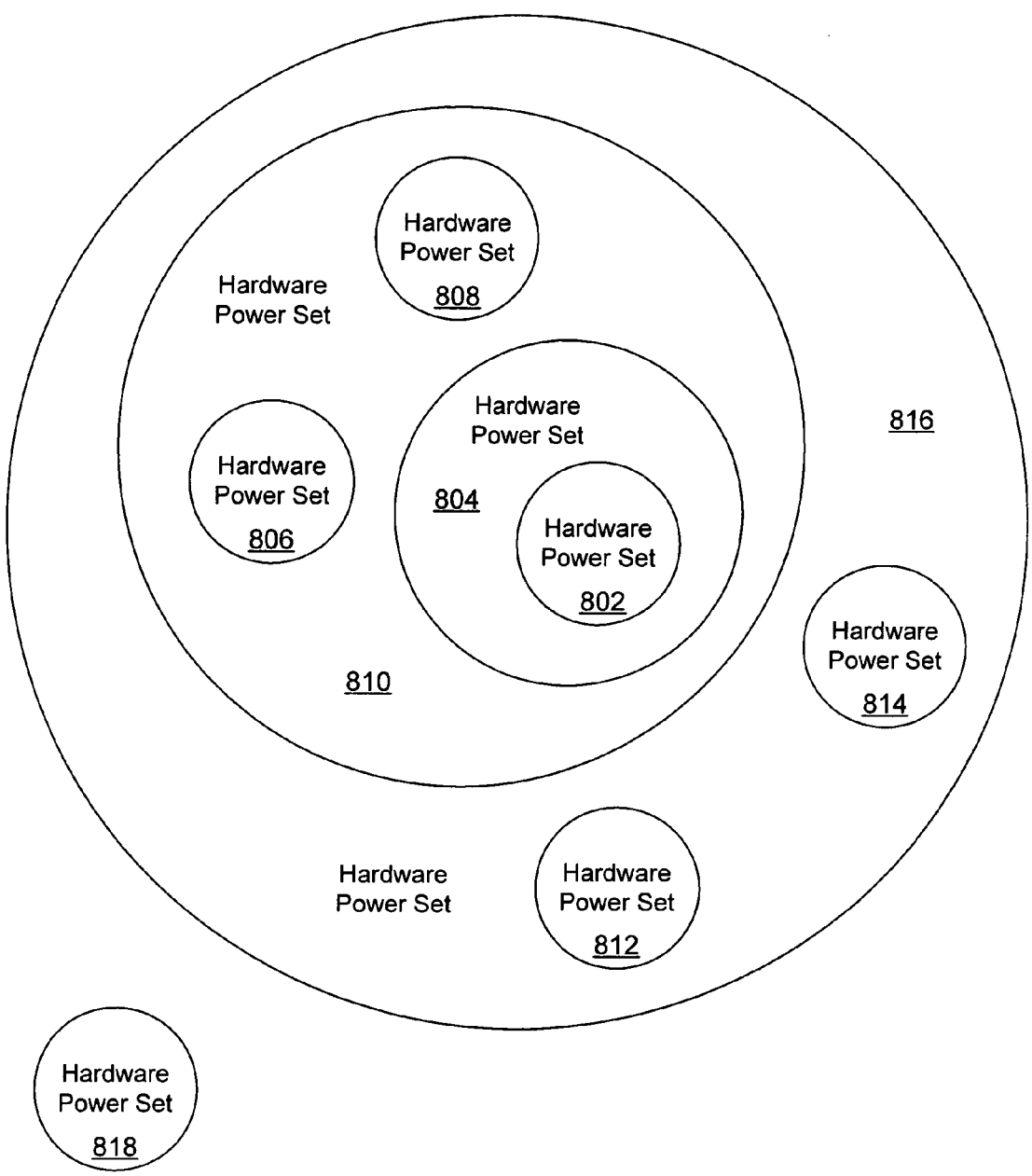
FIG. 8 is a schematic diagram illustrating an example set of hardware power sets in accordance with an embodiment of the invention.

FIG. 8 illustrates an example set of hardware power sets in accordance with an embodiment of the invention. Hardware power set 802 may represent a minimal power set, for example, a particular hardware power set referencing the system memory 130 (FIG. 1). Hardware power set 804 contains hardware power set 802 and may reference additional components. For example, hardware power set 804 may further reference processing unit 120 and the portion of the system bus 122 that connects the processing unit 120 to the system memory 130. Hardware power set 806 may reference computer hardware components that enable network communications, for example, network interface 170 and the portion of the system bus 122 connecting the network interface 170 to the processing unit 120 and the system memory 130. Hardware power set 808 may reference basic mobile personal computer user alert hardware, for example, the auxiliary display 198, the speakers 195 and portions of the output peripheral interface 194 and the system bus 122. Hardware power set 810 contains hardware power sets 804, 806 and 808 (and 802 indirectly). Hardware power set 810 may reference additional components, although in this example it doesn't.

Hardware power set 812 may reference computer hardware components that enable access to non-volatile memory, for example, the non-removable non-volatile memory interface 140 (FIG. 1) and the hard drive 141. Hardware power set 814 may reference computer hardware components that enable video output, for example, the video interface 190 and the monitor 191. Hardware power set 816 contains hardware power sets 810, 812 and 814. Hardware power set 816 may further reference the remaining computer hardware components of FIG. 1 except for low priority peripherals, for example, the printer 196. Hardware power set 818 may reference the low priority peripherals. The hardware power sets 802, 804, 806, 808, 810, 812, 814, 816 and 818 may represent a standard set of hardware power sets incorporated into each intermittent computing module 210 (FIG. 2). Additional, custom hardware power sets may be defined, for example, by application programs 204.

As the mobile personal computer cycles through sub-states of the intermittent computing system state 502 (FIG. 5), the mobile personal computer may turn on (i.e., supply power to each referenced computer hardware component) or turn off (i.e., remove power from each referenced computer hardware component) each of the hardware power sets 802, 804, 806, 808, 810, 812, 814, 816 and 818. Set mechanics (e.g., the properties of intersection, union and set difference operations) may apply when turning on or off a particular hardware power set. For example, in an embodiment of the invention, turning on hardware power set 810 when hardware power set 804 is already on need not include more than turning on hardware power sets 806 and 808. Similarly, a request to turn off hardware power set 810 but keep hardware power set 804 on need not include more than turning off hardware power sets 806 and 808. Hardware power sets need not be turned on or off in a particular order, for example, hardware power sets 804 and 812 may be turned on without turning on hardware power sets 810 and/or 816.

The hardware power sets 802, 804, 806, 808, 810, 812, 814, 816 and 818 may reference computer hardware components at a higher level of granularity than the level of granularity at which a particular mobile personal computer is able to control power supply. For example, the hardware power sets may reference portions of the system bus 131 (FIG. 1) but the mobile personal computer may have ability to power all or none of the system bus 131. In such a case, the mobile personal computer, e.g., the intermittent computing module 210 (FIG. 2) of the mobile personal computer, may power at least the computer hardware components referenced by a particular hardware power set, that is, the mobile personal computer may power a superset of the computer hardware components referenced by the hardware power set. For example, although hardware power set 804 references a portion of the system bus 131, the mobile personal computer may power the entire system bus 131 if it lacks control at the specified level of granularity.

Figure 9:
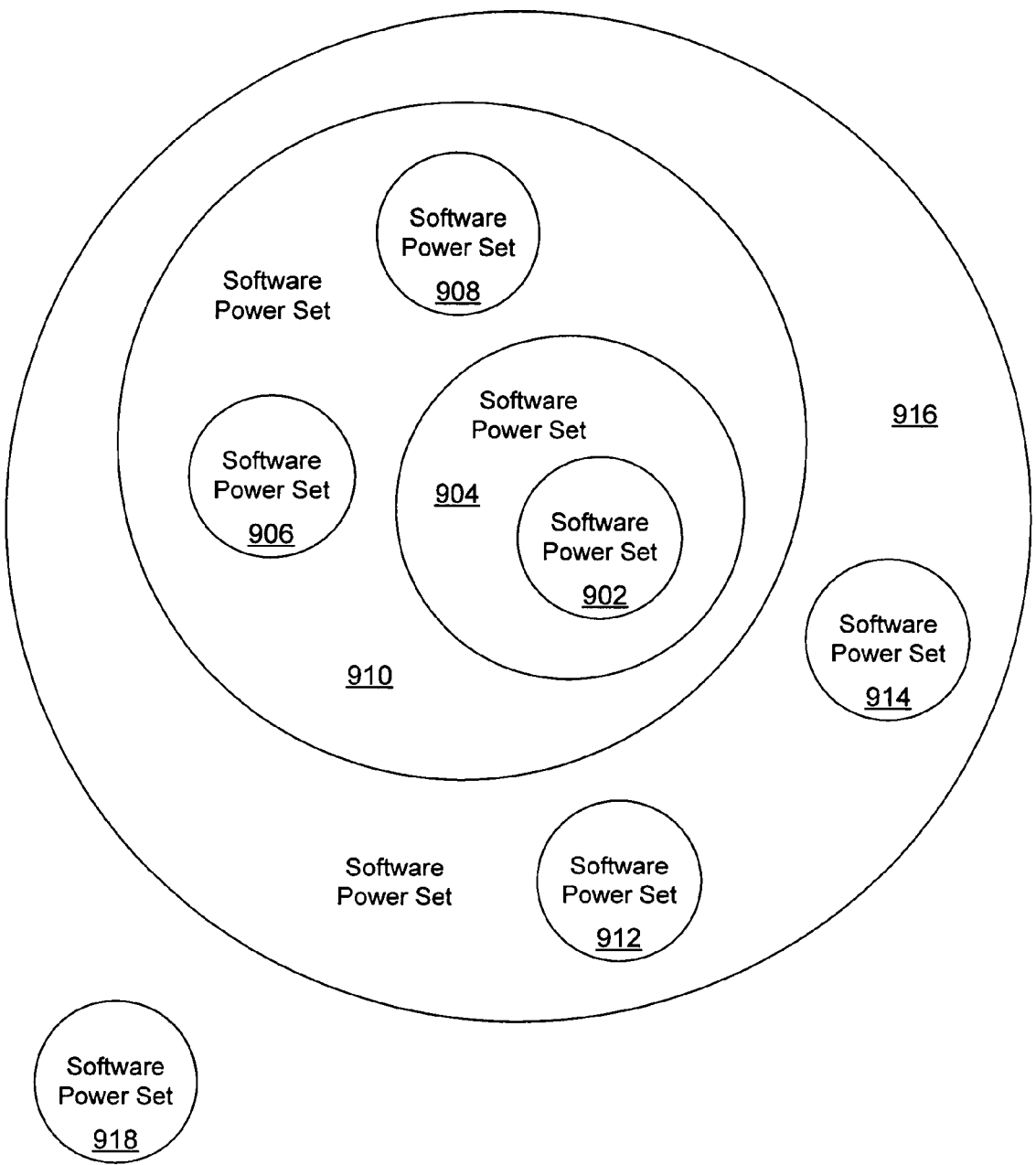
FIG. 9 is a schematic diagram illustrating an example set of software power sets in accordance with an embodiment of the invention.

Similar relationships may apply to software power sets 314 (FIG. 3). FIG. 9 illustrates an example set of software power sets in accordance with an embodiment of the invention. The software power sets 902, 904, 906, 908, 910, 912, 914, 916 and 918 each represent one of the software power sets 314. For example, the software power set 902 may reference a minimal "kernel" set of mobile personal computer operating system 202 (FIG. 2) software components. Each software power set 904, 906, 908, 910, 912, 914, 916 and 918 may reference additional computer software components such as device drivers 208, application programs 204 and dynamic link libraries (DLL). The computer software components referenced by software power sets 314 may correspond to computer hardware components reference by hardware power sets 312. For example, software power set 906 may reference device driver 208 software for the network interface 170 (FIG. 1) referenced by hardware power set 806. However, software power sets 314 and software power set organization may be independent of hardware power sets 312 and hardware power set organization.

Rather than software power sets 314 (FIG. 3) being turned on (e.g., loaded into fast access system memory 130 of FIG. 1) or turned off (e.g., unloaded from fast-access system memory 130) with each intermittent computing sub-state transition, software power sets 314 may be better understood as being turned on or off for the intermittent computing system state 502 (FIG. 5) as a whole, i.e., across power cycles. Each computer software component referenced by software power sets 314 may provide functionality to the mobile personal computer user if the computer software component is executable, e.g., located in storage (volatile or non-volatile) to which the processing unit 120 has access. Different types of storage may have different levels of power consumption and high power storage hardware may not be supplied power during low power sub-states of the intermittent computing system state 502. As a result, computer software components located in high power storage (e.g., the hard drive 141) may not be executable during low power sub-states of the intermittent computing system state 502.

Computer software components referenced by software power sets 314 (FIG. 3) that are turned on (e.g., by being registered with the intermittent computing module 302) may be loaded, for example, by the intermittent computing module 302, from high power storage into low power storage during one of the system states when power is supplied to the high power storage. Mobile personal computers may incorporate sophisticated caching mechanisms to manage the transfer of computer software components between storage types, for example, between plentiful but relatively slow access storage (e.g., the hard disk 141 of FIG. 1) and relatively scarce but faster access storage (e.g., the RAM 132). Such caching mechanisms may be adapted for the transfer of computer software components between storage that is plentiful but has a relatively high level of power consumption and storage that is relatively scarce but has a lower level of power consumption. Rather than guaranteeing the transfer of computer software components to a particular storage with certainty, such mechanisms typically make it likely or, at least, more likely that designated software components end up in the desired storage. Details of a suitable caching mechanism may be found in co-pending U.S. patent application Ser. No. 10/325,591, entitled "METHODS AND MECHANISMS FOR PROACTIVE MEMORY MANAGEMENT," filed on Dec. 20, 2002.

Figure 10:
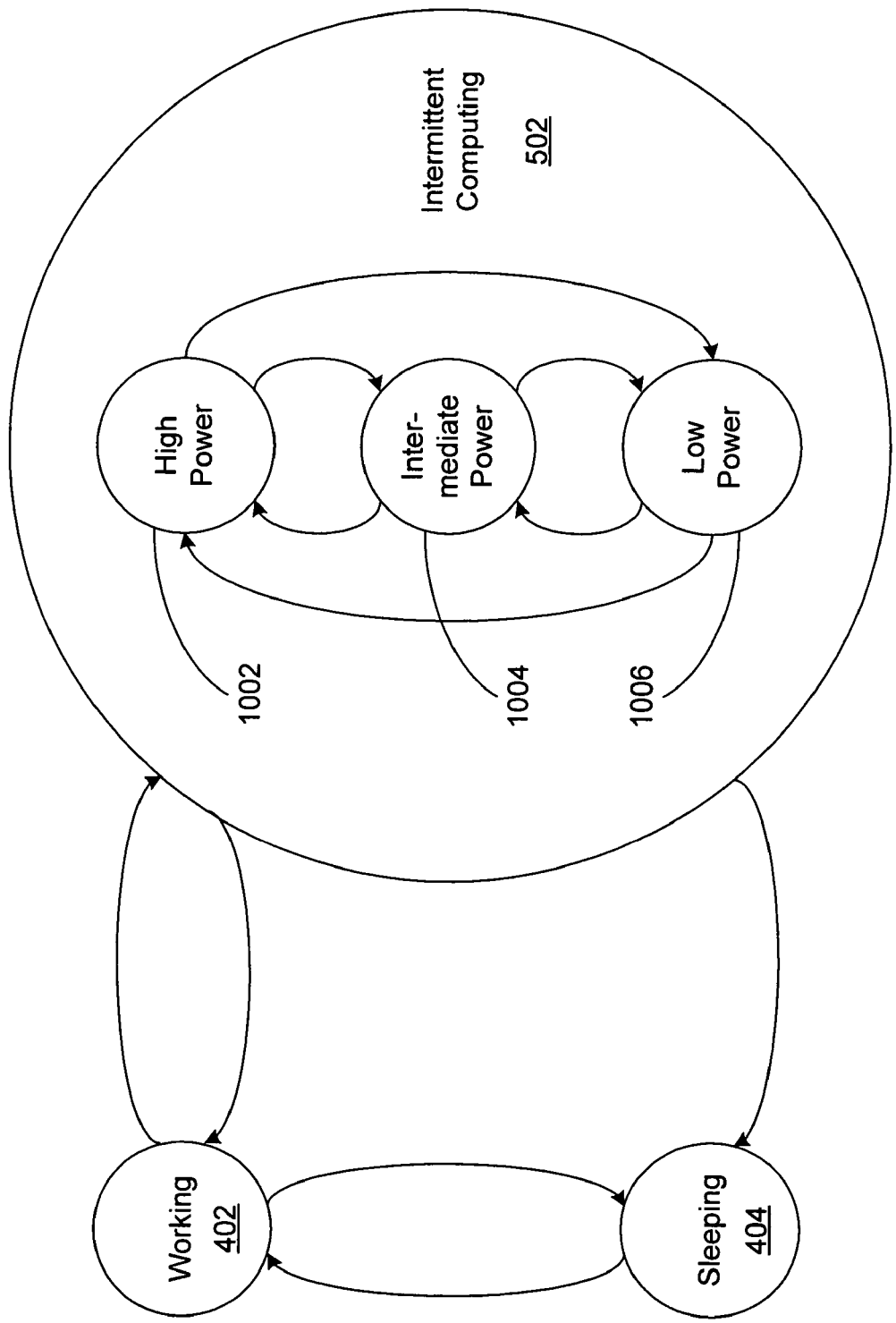
FIG. 10 is a state diagram depicting example system states in accordance with an embodiment of the invention including a tri-level intermitting computing system state.

Each sub-state of the intermittent computing system state 502 may be associated with one or more hardware power sets 312 (FIG. 3) and/or one or more software power sets 314. FIG. 10 illustrates an intermittent computing system state 502 that includes three example sub-states. The intermittent computing system state 502 of FIG. 10 includes a high power system sub-state 1002, an intermediate power system sub-state 1004 and a low power system sub-state 1006.

The low power system sub-state 1006 may be associated with hardware power set 804 (FIG. 8) and software power set 904 (FIG. 9). The low power system sub-state 1006 may provide only basic mobile personal computer operating system 202 (FIG. 2) functionality including, for example, intermittent computing module 210 functionality. The intermediate power system sub-state 1004 may be associated with hardware power set 810 and software power set 910. The intermediate power system sub-state 1004 may provide basic network communications and mobile personal computer user alert functionality. The high power system sub-state 1002 may be associated with hardware power sets 810 and 812 and with software power sets 910 and 918. The high power system sub-state 1002 may provide a restricted execution environment for a calendaring and messaging application including, for example, hard drive 141 (FIG. 1) access but not full video (e.g., monitor 191).

In the low power system sub-state 1006, the hardware power set 804 (FIG. 8) may be turned on and, during one of the system states in which the hard drive 141 (FIG. 1) was powered, the software power set 904 (FIG. 9) may have been loaded into low power storage, for example, into RAM 132. In the intermediate power system sub-state 1004, the hardware power set 810 may be turned on and, again, during one of the system states in which the hard drive 141 was powered, the software power set 910 may have been loaded into RAM 132. In transitioning between the low power system sub-state 1006 and the intermediate power system sub-state 1004, the computer hardware components referenced by the difference between the hardware power set 810 and the hardware power set 804 may have power supplied or removed. However, the computer software components loaded into RAM 132 may remain unaffected.

In the high power system sub-state 1002, the hardware power sets 810 and 812 (FIG. 8) may be turned on and, as the high power system sub-state 1002 is one of the system states in which the hard drive 141 (FIG. 1) is powered, unloaded computer software components referenced by software power sets 910 and 918 (FIG. 9) may be loaded into RAM 132. In transitioning from the high power system sub-state 1002 to the intermediate power system sub-state 1004, the hardware power set 812 may be turned off. The software components referenced by software power set 918 may be unloaded from RAM 132, although this may be unnecessary if there is sufficient RAM 132. In transitioning from the high power system sub-state 1002 to the low power system sub-state 1006, the hardware power sets 806, 808 and 812 may be turned off. The software components referenced by software power set 918 may be unloaded from RAM.

The software components associated with software power sets 906 and 908 may remain loaded in RAM 132 even thought they are not associated with the low power system sub-state 1006 because the low power system sub-state 1006 may next transition to the intermediate power system sub-state 1004 with which system state they are associated and which is not a system state in which the hard drive 141 is powered. The power cycle engine 304 (FIG. 3) of the intermittent computing module 302 may determine which computer hardware components to power and to remove power from in accord with the configured hardware power sets 312. The power cycle engine 304 may also determine which computer software components to load and unload from low power storage in accord with the configured software power sets 314. Alternatively, the intermittent computing module 302 may configure the caching mechanism of the mobile personal computer to load and unload from low power storage in accord with the configured software power sets 314.

Figure 11:
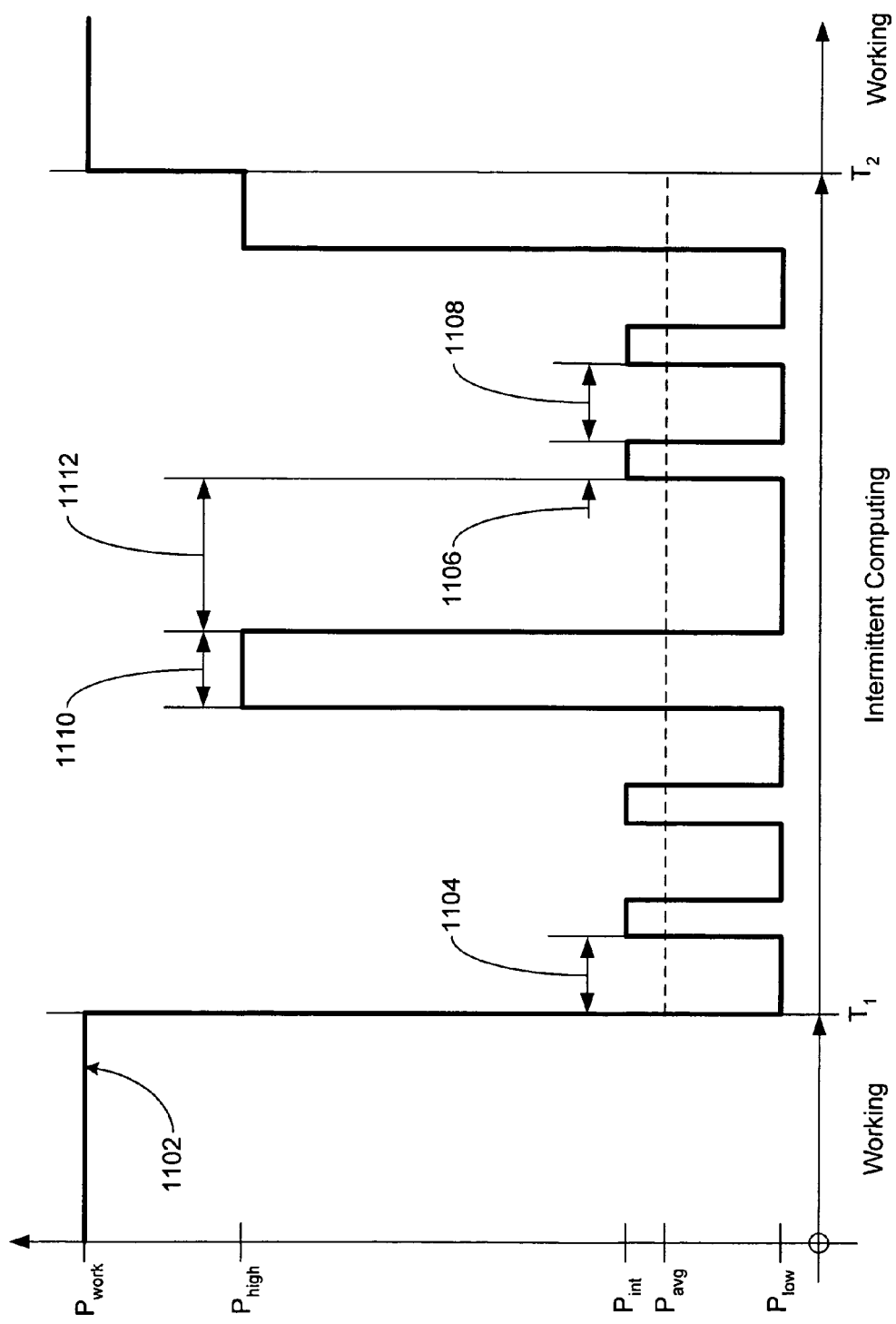
FIG. 11 is an example of a more complex power cycle graph in accordance with an embodiment of the invention.

More complex power cycle graphs are possible than the power cycle graph shown in FIG. 6. In particular, as the number of sub-states of the intermittent computing system state 502 (FIG. 5 and FIG. 10) increases, the intermittent computing schedule that generates the power cycle graph may become more complex. FIG. 11 shows a more complex example of a power cycle graph in accordance with an embodiment of the invention. The example power cycle graph 1102 may be generated by mobile personal computers incorporating the intermittent computing system state 502 with three sub-states as shown in FIG. 10.

Referring to FIG. 11, the mobile personal computer begins in the working system state 402 (FIG. 10) and then transitions to the intermittent computing system state 502 at time $T_1$. The mobile personal computer remains in the intermittent computing system state 502 until time $T_2$ and then transitions back to the working system state 402. When the mobile personal computer is in the working system state 402, it consumes power at level $P_{work}$. When in the intermittent computing system state 502, the power consumption of the mobile personal computer varies depending on the intermittent computing sub-state 1002, 1004 or 1006. In sub-state 1002, the mobile personal computer consumes a high level $P_{high}$ of power. In sub-state 1004, the mobile personal computer consumes an intermediate level $P_{int}$ of power. In sub-state 1006, the mobile personal computer consumes a low level $P_{low}$ of power.

After transitioning to the intermittent computing system state 502, the mobile personal computer remains in the low power system sub-state 1006 for a time 1104 and then transitions to the intermediate power system sub-state 1004. The mobile personal computer cycles from the intermediate power system sub-state 1004 to the low power system sub-state 1006 twice before transitioning from the low power system sub-state 1006 to the high power system sub-state 1002. Each intermediate to low power cycle is the same. The mobile personal computer remains in the intermediate power system sub-state 1004 for a wake time 1106 and then in the low power system sub-state for a sleep time 1108. While in the intermediate power system sub-state 1004, the mobile personal computer may check for the presence of wireless networks and communicate with remote computers 180 (FIG. 1) if wireless network service is present. The mobile personal computer may alert the mobile personal computer user to incoming messages with, for example, the auxiliary display 198. However, the mobile personal computer may have to wait until it transitions to the high power system sub-state 1002 before the incoming message may be processed by, for example, the calendaring and messaging application which may not be available in the intermediate power system sub-state 1004.

The mobile personal computer remains in the high power system sub-state 1002 for a high power wake time 1110 and then returns to the low power system sub-state 1006 for a post-high power sleep time 1112. The post-high power sleep time 1112 may be different, for example, from the sleep time 1108. After another two intermediate to low power cycles, the mobile personal computer returns to the high power system sub-state 1002. This time, instead of returning to the low power system sub-state 1006, the mobile personal computer returns to the working system state 402. For example, this may be because one of the messages processed by the messaging application during the last high power system sub-state 1002 resulted in the messaging application triggering an intermittent computing system state 502 exit, because the calendaring application was configured to present a reminder shortly after time $T_2$, or because the mobile computer user pressed a key on the keyboard 162.

More complex intermittent computing schedules may result in lower average power consumption without the mobile computer user perceiving a loss of functionality. The intermittent computing schedule with the power cycle graph 1102 consumes an average power of level $P_{avg}$. The average power consumption of more complex intermittent computing schedules may be more difficult to calculate precisely than for simpler intermittent computing schedules.

Figure 12:
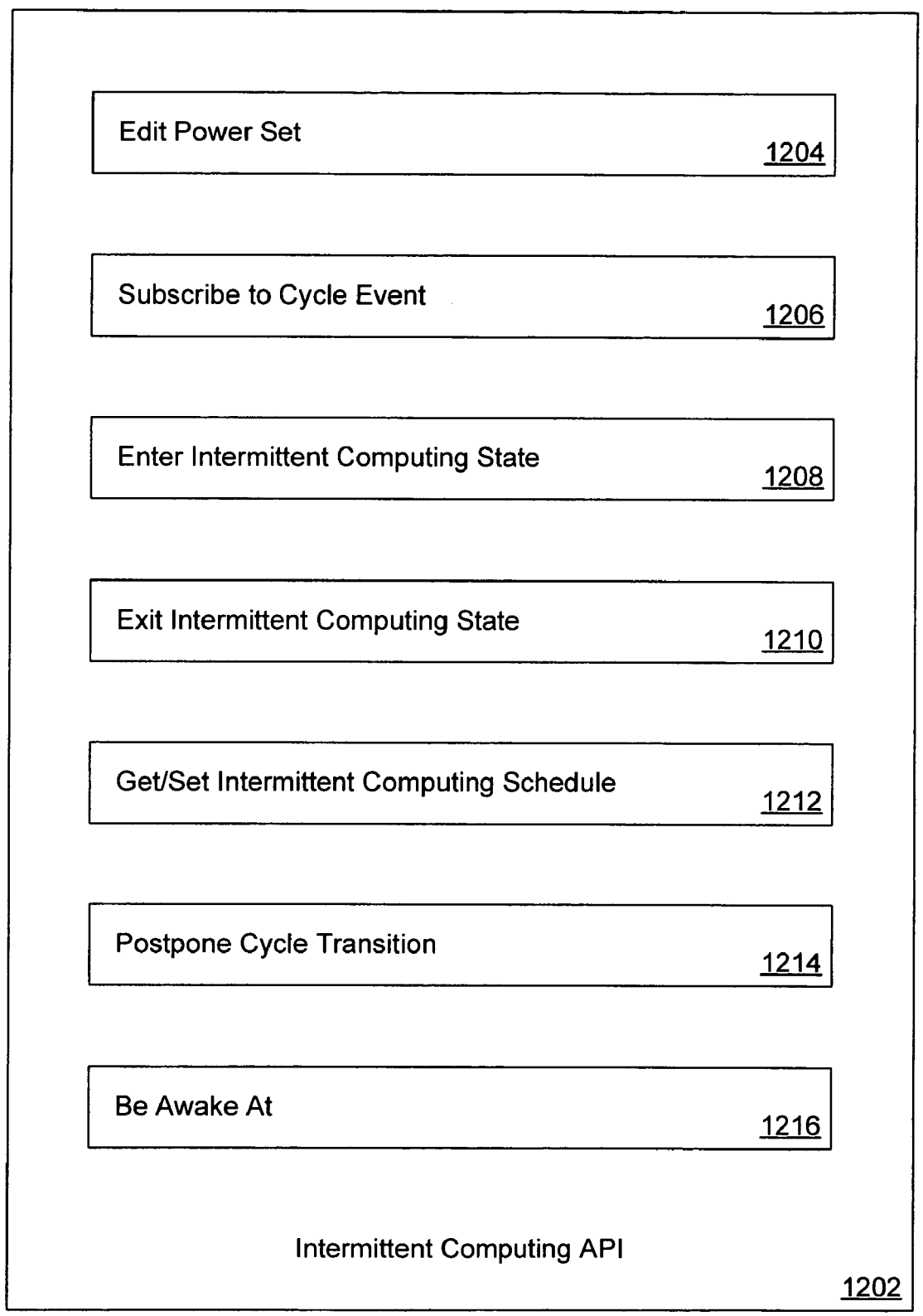
FIG. 12 is a schematic diagram illustrating an example intermittent computing application programming interface in accordance with an embodiment of the invention.

Computer software components may configure and interact with the intermittent computing module 302 (FIG. 3) through the intermittent computing application programming interface 310. FIG. 12 depicts an example intermittent computing application programming interface in accordance with an embodiment of the invention. The intermittent computing application programming interface 1202 may include an Edit Power Set element 1204, a Subscribe to Cycle Event element 1206, an Enter Intermittent Computing State element 1208, an Exit Intermittent Computing State element 1210, a Get/Set Intermittent Computing Schedule element 1212, a Postpone Cycle Transition element 1214, and a Be Awake At element 1216. Each application programming interface element 1204, 1206, 1208, 1210, 1212, 1214 and 1216 may include one or more interface specifications that specify the manner in which computer software components may interact with the intermittent computing module 302. As will be apparent to one of skill in the art, the interface specifications may include function call specifications, program object specifications, message specifications such as request/response message pairs, and/or any suitable programming interface specification.

The Edit Power Set application programming interface element 1204 may enable computer software components to create, read, update and delete hardware power sets 312 (FIG. 3) and software power sets 314 of the intermittent computing module 302. Interface specification parameters may include one or more hardware power sets 312, one or more software power sets 314 and power set names. Each hardware power set may reference one or more computer hardware components and one or more hardware power sets 312. Each software power set may reference one or more computer software components and one or more software power sets 314. For example, each computer hardware component reference may be a simple identifier, a data structure characterizing the computer hardware component, or a program object providing access to aspects of the computer hardware component. A power set name may be a character string labeling the power set.

The Subscribe to Cycle Event application programming interface element 1206 may enable computer software components to subscribe to power cycle events generated by the power cycle event publisher 308 (FIG. 3) of the intermittent computing module 302. Examples of power cycle events include entering intermittent computing system state, exiting intermittent computing system state, entering intermittent computing sub-state and exiting intermittent computing sub-state. For example, the power cycle event publisher 308 may publish a power cycle event by calling a callback function or by sending a power cycle event message. The power cycle event subscription may specify a set of power cycle events to which to subscribe, a set of hardware power sets to be turned on, a set of software power sets to be loaded and a set of conditions to be satisfied before notifying the subscriber of the power cycle events. Examples of conditions to be satisfied may include simple flags, time of day specifications, event notify rate limits and the like.

The Enter Intermittent Computing State application programming interface element 1208 may enable computer software components to cause the mobile personal computer to enter the intermittent computing system state 502 (FIG. 5 and FIG. 10). Interface specification parameters may include one of the intermittent computing sub-states to which to initially transition. The Exit Intermittent Computing State application programming interface element 1210 may enable computer software components to cause the mobile personal computer to exit the intermittent computing system state 502. Access to these interface elements 1208 and 1210 may be restricted to privileged software components, e.g., mobile personal computer operating system 202 (FIG. 2) software components.

The Get/Set Intermittent Computing Schedule application programming interface element 1212 may enable computer software components to read and configure the intermittent computing schedule of the power cycle engine 304 (FIG. 3) of the intermittent computing module 302. For a simple bi-level power cycle such as the power cycle illustrated in FIG. 6, interface specification parameters may include a sleep time and wake time pair, a power cycle rate and wake time pair, a power cycle rate alone (assuming wake time is minimized by software components responding to power cycle events), and a power cycle rate curve and control variable specification. Both the power cycle rate curve specification and the control variable specification may be references to functions or the like. More complex intermittent computing schedules that result in power cycle graphs such as the one illustrated in FIG. 11 may be built up from bi-level power cycle specifications. For example, interface specification parameters may include an ordered set of 3-tuples where each 3-tuple specifies a power cycle rate, a lower power system sub-state and a higher power system sub-state. As will be apparent to one of skill in the art, more generalized intermittent computing schedule specifications are possible, such as an ordered list of intermittent computing sub-states with times to reside in each sub-state to be repeated as necessary.

The Postpone Cycle Transition application programming interface element 1214 may enable computer software components to temporarily vary the intermittent computing schedule of the power cycle engine 304 (FIG. 3) of the intermittent computing module 302 by postponing the transition from the current intermittent computing sub-state. For example, one of the application programs 204 (FIG. 2) may postpone transition from the high power system sub-state 504 (FIG. 5) to the low power system sub-state 506 in order to fully receive a large incoming message from the wireless network. Interface specification parameters may include an amount of time for which to postpone the transition.

The Be Awake At application programming interface element 1216 may enable computer software components to vary the intermittent computing schedule of the power cycle engine 304 (FIG. 3) of the intermittent computing module 302 by specifying particular future times at which the mobile personal computer should attempt to be in particular intermittent computing sub-states. For example, the calendaring application may specify that the mobile personal computer should be in the high power system sub-state 504 (FIG. 5) at a particular date and time because a mobile personal computer user appointment reminder is due shortly thereafter. Interface specification parameters may include one or more date and time specifications, and/or one or more date and time range specifications, as well as the intermittent computing sub-states to be in at/during those times.

Figure 13:
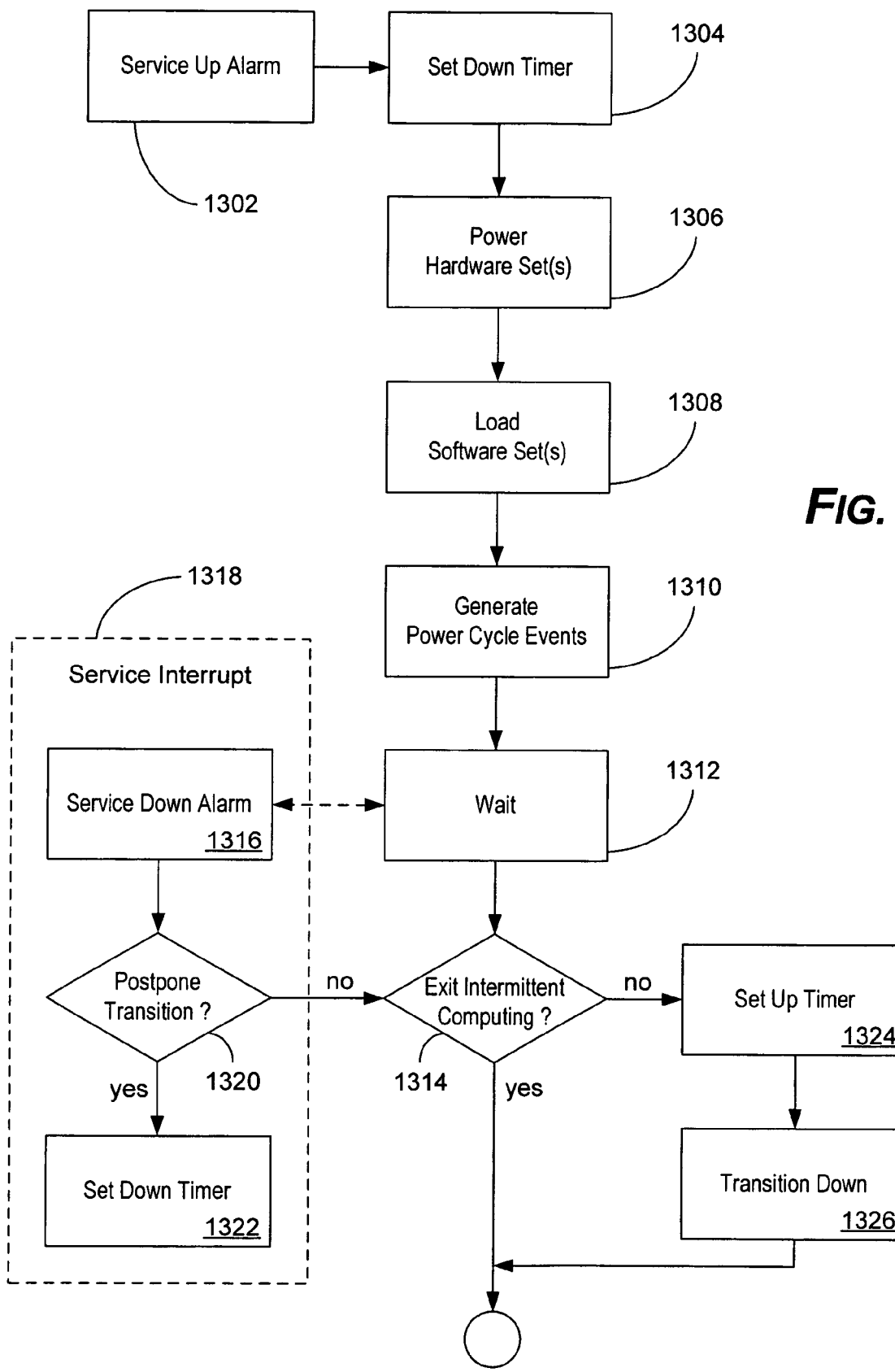
FIG. 13 is a flowchart depicting example steps that may be performed by a power cycle engine of the intermittent computing module in accordance with an embodiment of the invention.

The power cycle engine 304 (FIG. 3) may trigger intermittent computing sub-state transitions according to the intermittent computing schedule. FIG. 13 depicts example steps that may be performed by the power cycle engine 304 in accordance with an embodiment of the invention. The power cycle engine 304 may utilize real-time clock 124 (FIG. 1) timers. In an embodiment of the invention, the power cycle engine 304 sets real-time clock 124 timers to generate up alarms and down alarms. Up alarms signal the power cycle engine 304 that it may be time to transition from a lower power system sub-state (e.g., the low power system sub-state 1006 of FIG. 10) to a higher power system sub-state (e.g., the intermediate power system sub-state 1004). Down alarms signal the power cycle engine 304 that it may be time to transition from, for example, the high power system sub-state 1002 to the low power system sub-state 1006.

At step 1302, an up alarm is received by the power cycle engine 304 (FIG. 3) and the power cycle engine 304 services (e.g., stops) the real-time clock 124 (FIG. 1) timer that generated the up alarm. This assumes that the real-time clock 124 has previously been set by the power cycle engine 304 to generate the up alarm, e.g., that the mobile personal computer is in the intermittent computing system state 502 (FIG. 10). If the mobile personal computer is newly entering the intermittent computing system state 502, the up alarm may not be pending and step 1302 may be skipped.

At step 1304, a down timer may be set by the power cycle engine 304 (FIG. 3) to generate a down alarm at the time dictated by the intermittent computing schedule for the next transition to one of the lower power system sub-states. This assumes that the next transition will be to one of the lower power system sub-states. If the next transition will be to one of the higher power system sub-states then step 1304 may also be skipped.

At step 1306, the hardware power sets 312 (FIG. 3) associated with the current intermittent computing sub-state may be turned on. At step 1308, the computer software components associated with the current intermittent computing sub-state may be loaded. At step 1310, subscribers to power cycle events may be notified, for example, by the power cycle event publisher 308, that an entering intermittent computing system state or sub-state power cycle event has occurred. Step 1310 is described in more detail with reference to FIG. 14 below.

At step 1312, the procedure may wait for one of at least two events. First, some subscribers to power cycle events may be associated, for example, with a semaphore that the subscriber notifies when the subscriber has finished any work it wanted to do in response to the power cycle event. If each such subscriber indicates that it has finished responding to the power cycle event then the procedure may progress to step 1314. The procedure may also progress to step 1314 if a wait timeout occurs. Second, the down timer that was set in step 1304 may generate a down alarm. If the down alarm is generated, the procedure progresses to step 1316 of the service interrupt routine 1318.

At step 1316, the real-time clock 124 (FIG. 1) timer that generated the down alarm may be serviced. At step 1320, it may be determined if, for example, any power cycle event subscribers have requested that the down transition be postponed, for example, by utilizing the Postpone Cycle Transition application programming interface element 1214 (FIG. 12) of the application programming interface 310 (FIG. 3). If postponement has been requested, then the procedure progresses to step 1322. Otherwise, the service interrupt routine 1318 exits to step 1314. At step 1322, the down timer may be set to the requested postponement time and the service interrupt routine 1318 may return to step 1312 to wait.

At step 1314, it may be determined if, for examples, any power cycle event subscribers have requested that the mobile personal computer exit the intermittent computing system state 502 (FIG. 10), for example, by utilizing the Exit Intermittent Computing State application programming interface element 1210 (FIG. 12). If intermittent computing system state 502 exit has been requested, the procedure depicted by FIG. 13 may exit without setting an up timer. Otherwise, the procedure progresses to step 1324.

At step 1324, an up timer may be set by the power cycle engine 304 (FIG. 3) to generate an up alarm at the time dictated by the intermittent computing schedule for the next transition to one of the higher power system sub-states. When the up alarm occurs at that later time, the procedure may begin again at step 1302. In the meantime, the procedure progresses to step 1326. At step 1326, the mobile personal computer transitions from the current power system sub-state to one of the lower power system sub-states, for example, with steps similar to steps 1306, 1308, 1310 and 1312 described above. Following step 1326, the processing unit 120 (FIG. 1) may no longer be powered, but it may be powered up again, for example, by the next alarm generated by the real-time clock 124.

Figure 14:
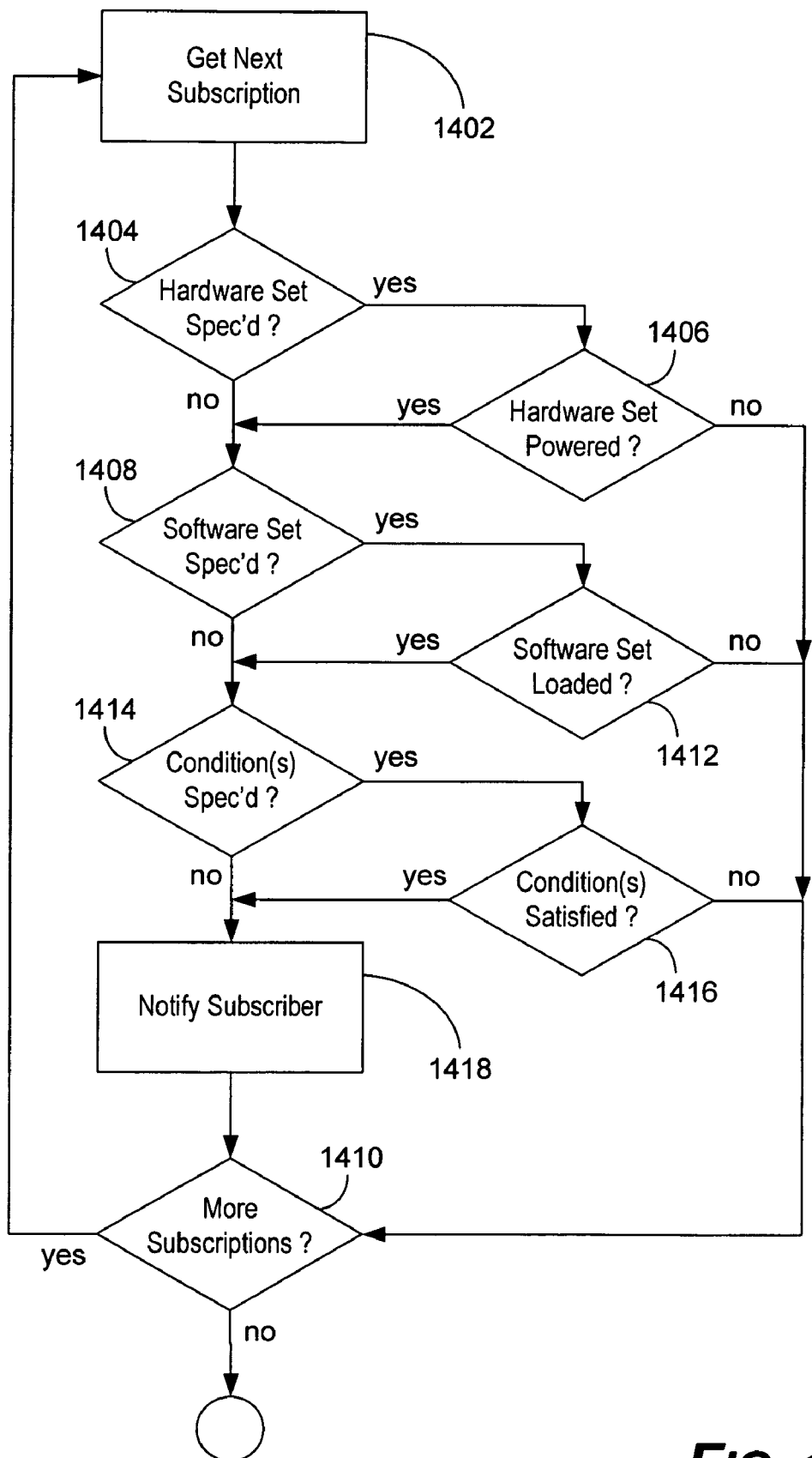
FIG. 14 is a flowchart depicting example steps that may be performed by a power cycle event publisher of the intermittent computing module in accordance with an embodiment of the invention.

FIG. 14 depicts example steps that may be performed by the power cycle event publisher 308 in accordance with an embodiment of the invention. At step 1402, a next subscription may be retrieved. At step 1404, the subscription may be checked for an associated hardware power set. If the subscription is associated with one of the hardware power sets 312 (FIG. 3), the procedure progresses to step 1406. Otherwise the procedure progresses to step 1408.

At step 1406, it may be determined if the computer hardware components referenced by the hardware power set have been supplied with power (e.g., at step 1306 of FIG. 13). If the referenced hardware components have not been supplied with power then the procedure progresses to step 1410 and the subscriber is not notified of the event on the assumption that the subscriber requires the hardware power set turned on in order to properly respond (alternative embodiments need not make this assumption). Otherwise, the procedure progresses to step 1408.

At step 1408, the subscription may be checked for an associated software power set. If the subscription is associated with one of the software power sets 314 (FIG. 3) then the procedure progresses to step 1412. Otherwise the procedure progresses to step 1414. At step 1412, it may be determined if the computer software components referenced by the software power set have been loaded into storage accessible to the processing unit 120 (FIG. 1), e.g., RAM 132 that is supplied with power. If the referenced software components have not been loaded then the procedure progresses to step 1410 and the subscriber is not notified of the event on the assumption that the subscriber requires the referenced software components loaded in order to properly respond (again, alternative embodiments need not make this assumption). Otherwise, the procedure progresses to step 1414.

At step 1414, the subscription may be checked for an associated set of conditions. If the subscription is associated with a set of conditions then the procedure progresses to step 1416. Otherwise, the procedure progresses to step 1418. At step 1416, each of the associated conditions may be checked for satisfaction. If each of the associated conditions is satisfied then the procedure progresses to step 1418. Otherwise, the procedure progresses to step 1410.

At step 1418, the subscriber may be notified of the power cycle event. For example, the subscriber may be called at a registered callback function, or a notification message may be sent to the subscriber at a notification address of the subscription. The procedure then progresses to step 1410. At step 1410, it may be determined if there are more subscriptions. If there are more subscriptions then the procedure returns to step 1402. Otherwise, the present procedure exits.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. Computer-readable storage medium having thereon computer-executable instructions for maintaining functional availability in a power-constrained personal computer over extended periods of time comprising:
   configuring a first timer to generate an up alarm signal;
   reconfiguring the power-constrained personal computer from a first of a set of relatively high functionality and high power configurations to one of a set of relatively low functionality and low power configurations; and
   in response to the up alarm signal, reconfiguring the power-constrained personal computer from said one of the set of relatively low functionality and low power configurations to a second of the set of relatively high functionality and high power configurations;
   wherein:
   each power-constrained personal computer configuration is associated with at least one software power set;
   each software power set references at least one software component of the power-constrained personal computer;
   the power-constrained personal computer includes a plurality of storage types for software components;
   at least one of the plurality of storage types is capable of being powered down while other storage types remain powered; and
   reconfiguring the power-constrained personal computer from said one of the set of relatively low functionality and low power configurations to the second of the set of relatively high functionality and high power configurations comprises loading, from a newly powered storage type, at least said at least one software component referenced by said at least one software power set associated with the second of the set of relatively high functionality and high power configurations.

2. The computer-readable storage medium of claim 1, wherein the first of the set of relatively high functionality and high power configurations and the second of the set of relatively high functionality and high power configurations are a same power-constrained personal computer configuration.

3. The computer-readable storage medium of claim 1, wherein:
   the computer-executable instructions further comprise configuring a second timer to generate a down alarm signal; and
   the reconfiguration of the power-constrained personal computer from the first of the set of relatively high functionality and high power configurations to said one of the set of relatively low functionality and low power configurations occurs in response to the down alarm signal.

4. The computer-readable storage medium of claim 3, wherein the first timer and the second timers are a same timer.

5. The computer-readable storage medium of claim 1, wherein:
   each power-constrained personal computer configuration is associated with at least one hardware power set;
   each hardware power set references at least one hardware component of the power-constrained personal computer; and
   reconfiguring the power-constrained personal computer from said one of the set of relatively low functionality and low power configurations to the second of the set of relatively high functionality and high power configurations comprises supplying power to at least said at least one hardware component referenced by said at least one hardware power set associated with the second of the set of relatively high functionality and high power configurations.

6. The computer-readable storage medium of claim 1, wherein:
   each power-constrained personal computer configuration is associated with at least one hardware power set;
   each hardware power set references at least one hardware component of the power-constrained personal computer; and
   reconfiguring the power-constrained personal computer from the first of the set of relatively high functionality and high power configurations to said one of the set of relatively low functionality and low power configurations comprises removing power from said at least one hardware component referenced by said at least one hardware power set associated with
   the first of the set of relatively high functionality and high power configurations except where doing so would also remove power from said at least one hardware component referenced by said at least one hardware power set associated with said one of the set of relatively low functionality and low power configurations.

7. The computer-readable storage medium of claim 1, wherein reconfiguring the power-constrained personal computer from said one of the set of relatively low functionality and low power configurations to the second of the set of relatively high functionality and high power configurations further comprises loading, from the newly powered storage type, at least said at least one software component referenced by said at least one software power set associated with power-constrained personal computer configurations in which the newly powered storage type is powered down.

8. The computer-readable storage medium of claim 1, wherein reconfiguring the power-constrained personal computer from at least one of the set of relatively low functionality and low power configurations to at least one of the set of relatively high functionality and high power configurations results in an increase in performance of the power-constrained personal computer.

9. The computer-readable storage medium of claim 1, wherein the first timer is clocked by a real-time clock.

10. The computer-readable storage medium of claim 1, wherein the up alarm signal is scheduled in accordance with an intermittent computing schedule.

11. The computer-readable storage medium of claim 1, wherein the power-constrained personal computer includes a hard drive.

12. The computer-readable storage medium of claim 1, wherein the power-constrained personal computer includes an Industry Standard Architecture (ISA) compatible system bus.

13. A power-constrained personal computer, comprising an intermittent computing module, the intermittent computing module comprising a power cycle engine configured to, at least:
- transition the power-constrained personal computer to an intermittent computing system state;
- transition the power-constrained personal computer between sub-states of the intermittent computing system state according to an intermittent computing schedule; and
- alter a level of power consumed by the power-constrained personal computer in each sub-state of the intermittent computing system state;
- wherein the intermittent computing module further comprises an application programming interface, the application programming interface comprising:
- an Enter Intermittent Computing State element capable of triggering the transition of the power-constrained personal computer to the intermittent computing system state;
- a Get/Set Intermittent Computing Schedule element capable of configuring the intermittent computing schedule; and
- an Edit Power Set element enabling the configuration of said at least one hardware power set
- wherein:
- each sub-state of the intermittent computing system state is associated with at least one hardware power set; and
- each hardware power set references at least one hardware component of the power-constrained personal computer.

14. The power-constrained personal computer of claim 13, wherein:
- the intermittent computing system state has a lower power system sub-state and a higher power system sub-state; and
- the intermittent computing schedule comprises cycling between the lower power system sub-state and the higher power system sub-state at a power cycle rate.

15. The power-constrained personal computer of claim 13, wherein the intermittent computing schedule comprises:
- an ordered list of sub-states of the intermittent computing system state; and
- for each sub-state of the intermittent computing system state in the ordered list, a duration to reside in the sub-state of the intermittent computing system state.

16. The power-constrained personal computer of claim 13, wherein the intermittent computing module further comprises a power cycle event publisher configured to, at least, publish a set of power cycle events, the set of power cycle events comprising an entering intermittent computing sub-state event.

17. The power-constrained personal computer of claim 13, wherein:
- the intermittent computing module further comprises a power set database containing at least one hardware power set; and
- altering the level of power consumed by the power-constrained personal computer in each sub-state of the intermittent computing system state comprises altering a supply of power to at least one of said at least one hardware component referenced by said at least one hardware power set associated with the sub-state of the intermittent computing system state.

18. The power-constrained personal computer of claim 13, wherein the power-constrained personal computer includes a hard drive.

19. The power-constrained personal computer of claim 13, wherein the power-constrained personal computer includes an Industry Standard Architecture (ISA) compatible system bus.

20. Computer-readable storage medium having thereon computer-executable instructions for interacting with at least one element of an application programming interface of an intermittent computing module, the application programming interface of the intermittent computing module comprising:
- an Enter Intermittent Computing State element capable of transitioning a power-constrained personal computer to an intermittent computing system state having sub-states that transition according to an intermittent computing schedule; and
- a Get/Set Intermittent Computing Schedule element capable of configuring the intermittent computing schedule;
- wherein:
- each sub-state of the intermittent computing system state is associated with at least one of (i) at least one hardware power set, (ii) at least one software power set;
- each hardware power set references at least one hardware component of the power-constrained personal computer;
- each software power set references at least one software component of the power-constrained personal computer; and
- the application programming interface of the intermittent computing module further comprises an Edit Power Set element enabling the configuration of at least one of (i) said at least one hardware power set, and (ii) said at least one software power set.

21. The computer-readable storage medium of claim 20, wherein:
- the intermittent computing system state has a low power system sub-state and a high power system sub-state; and
- the Get/Set Intermittent Computing Schedule element comprises a first interface specification including a first parameter indicating a power cycle rate at which to cycle between the low power system sub-state and the high power system sub-state.

22. The computer-readable storage medium of claim 21, wherein the first interface specification further includes a second parameter indicating a wake time to reside in the high power system sub-state.

23. The computer-readable storage medium of claim 21, wherein:
- the Get/Set Intermittent Computing Schedule element further comprises a second interface specification including:
- a first parameter indicating a power cycle rate function; and
- a second parameter indicating a power cycle rate control parameter; and a power cycle rate at which to cycle between the low power system sub-state and the high power system sub-state is determined by a transformation of the power cycle rate control parameter by the power cycle rate function.

24. The computer-readable storage medium of claim 20, wherein the Get/Set Intermittent Computing Schedule element, comprises an interface specification including a parameter indicating the intermittent computing schedule, the intermittent computing schedule comprising:
- an ordered list of sub-states of the intermittent computing system state; and for each sub-state of the intermittent computing system state in the ordered list, a duration to reside in the sub-state of the intermittent computing system state.

25. The computer-readable storage medium of claim 20, wherein the application programming interface of the intermittent computing module further comprises a Be Awake At element enabling specification of at least one time period and, for each time period, at least one of the sub-states of the intermittent computing system state to reside in during the time period.

26. Computer-readable storage medium having thereon computer-executable instructions for maintaining functional availability in a power-constrained personal computer over extended periods of time comprising:

configuring a first timer to generate an up alarm signal;

reconfiguring the power-constrained personal computer from a first of a set of relatively high functionality and high power configurations to one of a set of relatively low functionality and low power configurations;

in response to the up alarm signal, reconfiguring the power-constrained personal computer from said one of the set of relatively low functionality and low power configurations to a second of the set of relatively high functionality and high power configurations;

each power-constrained personal computer configuration is associated with at least one software power set;

each software power set references at least one software component of the power-constrained personal computer;

the power-constrained personal computer includes a plurality of storage types for software components;

at least one of the plurality of storage types is capable of being powered down while other storage types remain powered;

the power-constrained personal computer includes a caching mechanism for transferring software components between scarce and plentiful storage types; and the computer-executable instructions further comprise configuring the caching mechanism to transfer software components referenced by software power sets associated with each power-constrained personal computer configuration to at least one storage type that remains powered in the power-constrained personal computer configuration.

27. Computer-readable storage medium having thereon computer-executable instructions for interacting with at least one element of an application programming interface of an intermittent computing module, the application programming interface of the intermittent computing module comprising:

an Enter Intermittent Computing State element capable of transitioning a power-constrained personal computer to an intermittent computing system state having sub-states that transition according to an intermittent computing schedule; and a Get/Set Intermittent Computing Schedule element capable of configuring the intermittent computing schedule;

wherein the application programming interface of the intermittent computing module further comprises a Subscribe to Cycle Event element enabling subscription to a set of power cycle events, the set of power cycle events comprising an entering intermittent computing sub-state event.

* * * * *